US009977715B2

(12) United States Patent
Bailor et al.

(10) Patent No.: US 9,977,715 B2
(45) Date of Patent: *May 22, 2018

(54) TECHNIQUES TO MANAGE COLLABORATIVE DOCUMENTS

(71) Applicant: Microsoft Technology Licensing, LLC, Redmond, WA (US)

(72) Inventors: Jonathan Bailor, Bellevue, WA (US); Matthew Wood, Seattle, WA (US); Brian Marshall, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

This patent is subject to a terminal disclaimer.

(21) Appl. No.: 14/709,819

(22) Filed: May 12, 2015

(65) Prior Publication Data

US 2015/0269033 A1    Sep. 24, 2015

Related U.S. Application Data

(63) Continuation of application No. 13/316,763, filed on Dec. 12, 2011, now Pat. No. 9,053,079.

(51) Int. Cl.
*G06F 17/22* (2006.01)
*G06F 11/14* (2006.01)
(Continued)

(52) U.S. Cl.
CPC ...... *G06F 11/1446* (2013.01); *G06F 17/2288* (2013.01); *G06F 17/24* (2013.01);
(Continued)

(58) Field of Classification Search
CPC ........... H04L 65/4015; H04L 29/06401; H04L 29/06027; G06F 17/2288; G06F 17/30168;
(Continued)

(56) References Cited

U.S. PATENT DOCUMENTS 5,297,032 A    3/1994 Trojan et al.
5,321,750 A    6/1994 Nadan
(Continued)

FOREIGN PATENT DOCUMENTS

CN    1489075 A    4/2004
CN    102110083    6/2011
(Continued)

OTHER PUBLICATIONS

Third Office Action and Search Report Issued in Chinese Patent Application No. 201210532091.4, dated Aug. 19, 2015, 12 Pages.
(Continued)

*Primary Examiner* — Maikhanh Nguyen

(57) ABSTRACT

Techniques to manage collaborative documents are described. An application program may comprise a document render component to render a first document instance of a collaborative document, a document share component to receive a document update list comprising a set of change records for a second document instance of the collaborative document, and modify properties of one or more constructs for the first document instance based on the change records to form a merged document instance of the collaborative document, and an undo manager component to manage a local undo stack for the first document instance, the local undo stack comprising a set of undo records, and determine whether to preserve one or more of the undo records of the local undo stack after formation of the merged document instance based on one or more of the change records. Other embodiments are described and claimed.

14 Claims, 14 Drawing Sheets

(51) Int. Cl.
*G06F 17/24* (2006.01)
*G06F 17/30* (2006.01)

(52) U.S. Cl.
CPC ...... *G06F 17/241* (2013.01); *G06F 17/30011* (2013.01); *G06F 17/30575* (2013.01); *G06F 2201/84* (2013.01)

(58) Field of Classification Search
CPC .... G06F 17/24; G06F 11/1464; G06F 17/241; G06F 2201/84; G06F 17/30011; G06F 17/30575
See application file for complete search history.

(56) References Cited

U.S. PATENT DOCUMENTS

| | | | |
|---|---|---|---|
| 5,339,392 A | 8/1994 | Risberg et al. | |
| 5,432,932 A | 7/1995 | Chen et al. | |
| 5,819,284 A | 10/1998 | Farber et al. | |
| 5,890,181 A * | 3/1999 | Selesky | G06F 17/21 715/255 |
| 5,959,621 A | 9/1999 | Nawaz et al. | |
| 6,067,551 A * | 5/2000 | Brown | G06Q 10/10 |
| 6,088,706 A | 7/2000 | Hild | |
| 6,188,405 B1 | 2/2001 | Czerwinski et al. | |
| 6,192,378 B1 * | 2/2001 | Abrams | G06F 17/30362 |
| 6,216,141 B1 | 4/2001 | Straub et al. | |
| 6,278,448 B1 | 8/2001 | Brown et al. | |
| 6,311,058 B1 | 10/2001 | Wecker et al. | |
| 6,449,638 B1 | 9/2002 | Wecker et al. | |
| 6,456,334 B1 | 9/2002 | Duhault | |
| 6,510,553 B1 | 1/2003 | Hazra | |
| 6,523,134 B2 * | 2/2003 | Korenshtein | G06F 9/4443 714/16 |
| 6,724,403 B1 | 4/2004 | Santoro et al. | |
| 6,772,154 B1 | 8/2004 | Daynes et al. | |
| 6,807,558 B1 | 10/2004 | Hassett et al. | |
| 6,832,355 B1 | 12/2004 | Duperrouzel et al. | |
| 6,976,210 B1 | 12/2005 | Silva et al. | |
| 7,028,264 B2 | 4/2006 | Santoro et al. | |
| 7,107,294 B2 * | 9/2006 | Romanufa | G06F 17/30368 |
| 7,155,666 B2 * | 12/2006 | Breuer | G06F 17/246 715/212 |
| 7,370,269 B1 * | 5/2008 | Prabhu | G06F 17/30873 715/201 |
| 7,376,907 B2 | 5/2008 | Santoro et al. | |
| 7,499,955 B2 * | 3/2009 | Kao | G06F 9/466 |
| 7,543,047 B2 * | 6/2009 | Park | G06F 17/30575 707/999.201 |
| 7,707,210 B2 | 4/2010 | Stefik et al. | |
| 7,792,788 B2 * | 9/2010 | Melmon | H04L 67/1095 707/608 |
| 7,797,274 B2 | 9/2010 | Strathearn et al. | |
| 7,823,060 B2 * | 10/2010 | Mohamed | G06F 17/24 714/19 |
| 7,900,142 B2 * | 3/2011 | Baer | G06F 17/2211 707/639 |
| 7,933,632 B2 | 4/2011 | Flynt et al. | |
| 7,937,663 B2 | 5/2011 | Parker et al. | |
| 7,962,853 B2 * | 6/2011 | Bedi | G06F 17/248 715/230 |
| 7,979,804 B1 | 7/2011 | Schang | |
| 7,987,431 B2 | 7/2011 | Santoro et al. | |
| 8,209,603 B2 | 6/2012 | Bailor et al. | |
| 8,239,760 B2 * | 8/2012 | Hanson | G06F 17/2288 715/255 |
| 8,352,870 B2 * | 1/2013 | Bailor | G06F 17/30873 715/230 |
| 8,407,670 B2 * | 3/2013 | Hegde | G06F 8/71 717/122 |
| 8,417,666 B2 * | 4/2013 | Bailor | G06F 17/24 707/608 |
| 9,207,933 B2 * | 12/2015 | Bostick | G06F 8/71 |
| 2002/0065848 A1 * | 5/2002 | Walker | G06F 17/24 715/205 |
| 2004/0122870 A1 * | 6/2004 | Park | G06F 17/30575 |
| 2004/0177343 A1 * | 9/2004 | McVoy | G06F 8/71 717/122 |
| 2004/0205663 A1 * | 10/2004 | Mohamed | G06F 17/24 715/255 |
| 2004/0268187 A1 * | 12/2004 | Burke | G06F 8/38 714/40 |
| 2005/0071386 A1 | 3/2005 | Wolfgang et al. | |
| 2005/0177617 A1 * | 8/2005 | Banginwar | H04L 69/329 709/203 |
| 2005/0234943 A1 | 10/2005 | Clarke | |
| 2006/0190833 A1 | 8/2006 | SanGiovanni et al. | |
| 2006/0200755 A1 * | 9/2006 | Melmon | H04L 67/1095 715/234 |
| 2006/0230311 A1 | 10/2006 | Kao et al. | |
| 2007/0088729 A1 * | 4/2007 | Baca | G06F 9/4443 |
| 2007/0186157 A1 * | 8/2007 | Walker | G06F 17/24 715/234 |
| 2007/0283321 A1 * | 12/2007 | Hegde | G06F 8/71 717/110 |
| 2008/0172607 A1 * | 7/2008 | Baer | G06F 17/24 715/255 |
| 2008/0177782 A1 | 7/2008 | Poston et al. | |
| 2008/0189646 A1 | 8/2008 | Bohle | |
| 2008/0235579 A1 * | 9/2008 | Champion | G06F 17/2211 715/273 |
| 2009/0006946 A1 * | 1/2009 | Hanson | G06F 17/24 715/255 |
| 2009/0249224 A1 * | 10/2009 | Davis | G06Q 10/10 715/753 |
| 2009/0271696 A1 | 10/2009 | Bailor et al. | |
| 2009/0276698 A1 | 11/2009 | Clarke et al. | |
| 2009/0327294 A1 | 12/2009 | Bailor et al. | |
| 2010/0281074 A1 | 11/2010 | Bailor et al. | |
| 2010/0281362 A1 | 11/2010 | Bailor et al. | |
| 2011/0225547 A1 | 9/2011 | Fong et al. | |
| 2014/0129645 A1 | 5/2014 | Mo | |

FOREIGN PATENT DOCUMENTS

| | | |
|---|---|---|
| WO | 9926127 | 5/1999 |
| WO | 2009/061638 | 5/2009 |
| WO | 2009/079116 | 6/2009 |

OTHER PUBLICATIONS

Citro et al. "Conflict Management for Real-Time Collaborative Editing in Mobile Replicated Architectures", School of Computer Science and Information Technology, 2007, 10 pages.

"Introduction to Microsoft Sync Framework File Synchronization Provider", Retrieved at <<http://msdn.microsoft.com/en-us/sync/bb887623.aspx>>, Oct. 2009, pp. 6, author unknown.

Hodges Buck, "Team Foundation PowerToys", Retrieved at <<http://blogs.msdn.com/b/buckh/archive/2005/11/16/493401.aspx>&- gt;, Retrieved Date:Jul. 4, 2011, pp. 7.

"Skip undo step in Vim", Retrieved at <<http://stackoverflow.com/questions/5773292/skip-undo-step-in-vim&- gt;>, Retrieved Date:Jul. 4, 2011, pp. 2, author unknown.

Meier et al., "Guidelines: Source Control", Retrieved at <<http://unsdn.microsoft.com/en-us/library/bb668944.aspx>>, Sep. 2007, 2011, pp. 33.

First Office Action and Search Report Received for China Patent Application No. 201210532091.4, dated Oct. 10, 2014, 12 pages.

* cited by examiner

1100

RETRIEVE A SET OF UNDO RECORDS OF A LOCAL UNDO STACK, EACH UNDO RECORD COMPRISING INFORMATION TO UNDO A MODIFICATION MADE TO A CONSTRUCT OF A FIRST DOCUMENT VERSION OF A COAUTHORED DOCUMENT
*1102*

RETRIEVE A SET OF CHANGE RECORDS OF A SYNCHRONIZATION LIST, EACH CHANGE RECORD COMPRISING INFORMATION FOR A MODIFICATION MADE TO A CONSTRUCT OF A SECOND DOCUMENT VERSION OF THE COAUTHORED DOCUMENT
*1104*

COMPARE THE SET OF UNDO RECORDS AND THE SET OF CHANGE RECORDS
*1106*

DETERMINE WHETHER TO PRESERVE ONE OR MORE OF THE UNDO RECORDS OF THE LOCAL UNDO STACK BASED ON THE COMPARISON RESULTS
*1108*

TECHNIQUES TO MANAGE COLLABORATIVE DOCUMENTS

CROSS-REFERENCE TO RELATED APPLICATIONS

This application is continuation of and claims priority to U.S. patent application Ser. No. 13/316,763 entitled "Techniques to Manage Collaborative Documents," filed on Dec. 12, 2011, the subject matter of which is hereby incorporated by reference in its entirety.

BACKGROUND

In multi-user environments, it may be desirable for multiple users be able to edit the same document at the same time. Often, when multiple users are editing the document, confusion can exist as to how the various edits are added to the document. For example, sometimes multiple versions of the document are edited, making it difficult to merge the edits into a single, complete document in a smooth and unobtrusive manner. Further, merger of edits into a single document may affect other features of an application program, such as undo and/or redo features. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to document collaboration systems designed to manage collaborative documents. A document collaboration system is a system that allows multiple users to create or edit a single document, or different versions of a single document, at a same time. A single document created or edited by multiple users is sometimes referred to as a coauthored document or a collaborative document, reflecting the fact that the document has multiple authors contributing to its content or design.

Some embodiments are particularly directed to techniques to manage merge and undo/redo features for collaborative documents. In one embodiment, for example, an apparatus may comprise a processor circuit and an application program operative on the processor circuit to manage a collaborative document having a presentation surface with multiple constructs. The application program may comprise a document render component operative to render a first document instance of the collaborative document. The application program may further comprise a document share component operative to receive a document update list comprising a set of change records for a second document instance of the collaborative document, each change record comprising information for a modification made to a construct of the second document instance, and modify properties of one or more constructs for the first document instance based on the change records to form a merged document instance of the collaborative document. The application program may also comprise an undo manager component operative to manage a local undo stack for the first document instance, the local undo stack comprising a set of undo records each storing information to undo a modification made to a construct of the first document instance, and determine whether to preserve one or more of the undo records of the local undo stack after formation of the merged document instance based on one or more of the change records. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 11 illustrates an embodiment of a logic flow for the document collaboration system of FIG. 1.

DETAILED DESCRIPTION

Figure 1:
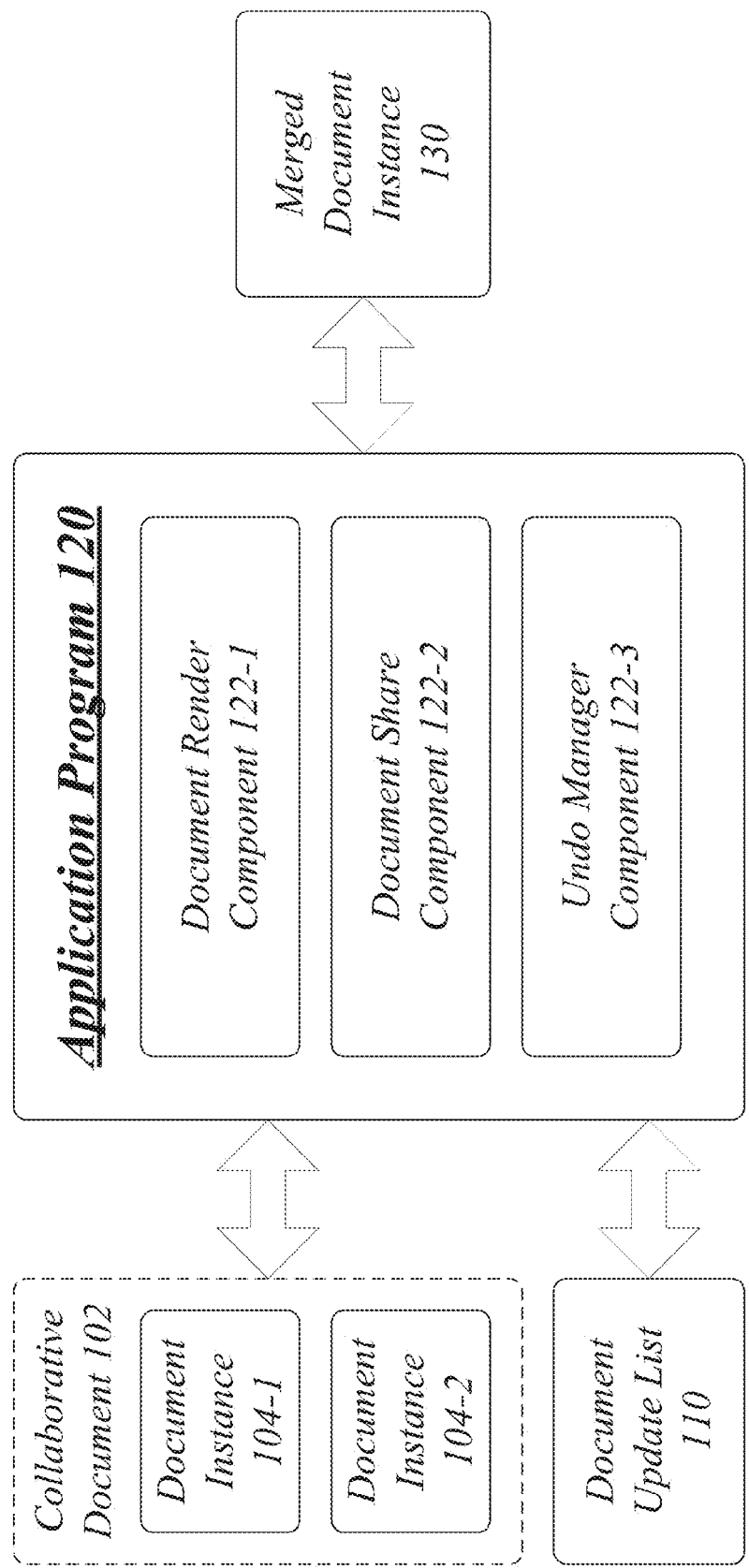
FIG. 1 illustrates an embodiment of a document collaboration system.

Various embodiments are generally directed to document collaboration systems that allow multiple users to create or edit a single document, or different versions of a single document, at a same time. Some embodiments are particularly directed to enhanced document collaboration systems designed to seamlessly refresh updates to different versions of a collaborative document without unduly disrupting the editing or viewing experience of the co-authors, or causing unnecessary consumption of system resources (e.g., compute cycles, memory, network bandwidth, etc.). In one embodiment, an enhanced document collaboration system may utilize a novel set of construct-based conflict rules or logic to automatically resolve conflicts for merge operations of edits to a collaborative document, thereby reducing or eliminating manual intervention by an author to resolve conflicts. In one embodiment, an enhanced document collaboration system may utilize a novel set of merge rules or logic to ensure that merge operations do not cause content or format changes to appear unexpectedly in a collaborative document. In one embodiment, an enhanced document collaboration system may perform merger operations without disrupting undo/redo features provided by the enhanced document collaboration system. As a result, the embodiments can improve affordability, scalability, modularity, extendibility, or interoperability for an operator, device or network.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the intended purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the needed method steps. The needed structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a document collaboration system 100. In one embodiment, the document collaboration system 100 may comprise a computer-implemented document collaboration system 100 having an application program 120 comprising one or more components 122-$a$. Although the document collaboration system 100 shown in FIG. 1 has a limited number of elements in a certain topology, it may be appreciated that the document collaboration system 100 may include more or less elements in alternate topologies as desired for a given implementation.

It is worthy to note that "a" and "b" and "c" and similar designators as used herein are intended to be variables representing any positive integer. Thus, for example, if an implementation sets a value for a=5, then a complete set of components 122-$a$ may include components 122-1, 122-2, 122-3, 122-4 and 122-5. The embodiments are not limited in this context.

In the illustrated embodiment shown in FIG. 1, the document collaboration system 100 may comprise an application program 120. The application program 120 may comprise any software program capable of operating in a multi-user mode allowing multiple users to simultaneously create or edit a collaborative document 102. In some cases, the application program 120 can be a stand-alone application suitable for fixed or mobile computing device (e.g., a desktop computer, a notebook computer, a smart phone, a tablet computer, etc.), but also can operate in conjunction with server-side applications to provide enhanced functions for multiple users in an organization. In one embodiment, the application program 120 may comprise an application program from a productivity suite of inter-related client applications, server applications and/or web services, designed for a particular operating system, such as a MICROSOFT® OFFICE productivity suite for MICROSOFT WINDOWS®, made by Microsoft Corporation, Redmond, Wash. Examples for application program 120 may include without limitation MICROSOFT WORD, MICROSOFT EXCEL®, MICROSOFT POWERPOINT®, MICROSOFT OUTLOOK®, MICROSOFT ACCESS®, MICROSOFT INFOPATH®, MICROSOFT ONENOTE®, MICROSOFT PROJECT, MICROSOFT PUBLISHER, MICROSOFT SHAREPOINT® WORKSPACE, MICROSOFT VISIO®, MICROSOFT OFFICE INTERCONNECT, MICROSOFT OFFICE PICTURE MANAGER, MICROSOFT SHAREPOINT DESIGNER, and MICROSOFT LYNC. Although particular examples of the application program 120 have been provided, it can be appreciated that the application program 120 may be implemented by any other suitable software program which is consistent with the described embodiments.

In one embodiment, for example, the application program 120 may comprise a montage application designed to generate a digital montage. A digital montage may comprise an aggregation of separate elements to form a single composite element. For instance, a digital montage may comprise a composite picture made up of several separate pictures, or a video sequence comprising a rapid sequence of disparate images. Electronic montage systems have been designed to create digital montages using digital content, such as a composite web page comprising different constituent web pages served from different web applications. Sometimes the constituent web pages are organized according to a central theme, such as a web pages related to a given search term used by a search engine, or web pages consistently visited by a user as stored in a browser history. Often, the constituent web pages are lower-fidelity representations of the actual web page due to space limitations of the composite web page. As such, a user may select a constituent web page to retrieve a higher-fidelity version of the selected web page for more in-depth viewing.

In one embodiment, the montage application may generate a digital montage using multimedia content sourced or communicated from heterogeneous data sources. The montage application may allow a user to generate a highly customized digital montage using content files generated by different software programs, such as various other types of application programs 120 as previously described. The digital montage may include a presentation surface having one or more tile objects comprising customized representations for an underlying content file. A tile object may be constructed using information selectively extracted from a content file and formatted according to a type definition specifically built for the content file. The type definition includes detailed information about a content file, such as file extensions, data schemas, formatting controls, embedded objects, embedded code, properties, scripts, and other file specific information. The type definition also includes a set of rules concerning types of information to extract from a content file, formatting of the extracted information, a number of tile object versions to build, and so forth. In this manner, a wider range of content files may be used to author a digital montage, while constructing highly representative tile objects providing meaningful information for a viewer. This approach allows viewers to easily peruse the tile objects in a montage, identify a content file of interest among the many tile objects, and select a tile object to quickly retrieve the content file for closer viewing.

The application program 120 may comprise a document render component 122-1. The document render component 122-1 may be generally arranged to render one or more document instances 104-b of a collaborative document 102. A document instance 104-b may comprise a particular instantiation or version of a collaborative document 102. Different document instances 104-b may be implemented or managed by different versions of application program 120 executing on different electronic devices. As shown in FIG. 1, for example, a collaborative document 102 may include two different document instances 104-1, 104-2. The document render component 122-1 of the application program 120 may render a first document instance 104-1 of the collaborative document for presentation on an output device for a local computing platform implementing the application 120, such as a display, for example. The document instance 104-2 may be rendered by another version of the application program 120 implemented by a remote computing platform separate from the local computing platform. For instance, the local and remote computing platforms may be implemented by two separate electronic devices connected in a client-server or peer-to-peer architecture, examples of which are given with reference to FIG. 12.

The application program 120 may comprise a document share component 122-2. The document share component 122-2 may be generally arranged to manage coauthoring or collaborative operations for the application program 120. Coauthoring operations enable two or more users or authors to access a single collaborative document 102 at the same time, edit or format different document instances 104-1, 104-2, and view updates made to the difference document instances 104-1, 104-2 after merge or synchronization operations occur. In order to initiate co-authoring operations, all authors need to open a same collaborative document 102 stored in a same location that supports co-authoring. For example, the collaborative document 102 may be stored in a shared folder on a MICROSOFT SKYDRIVE server, a same document library on a MICROSOFT SHAREPOINT server, or some other shared network resource.

The document share component 122-2 manages permissions, updates, and synchronization/merge operations performed on the document instances 104-1, 104-2 to control coauthor operations in structured and predictable manner. As shown in FIG. 1, the document share component 122-2 may periodically receive (or retrieve) a document update list 110. The document update list 110 may comprise a set of change records for the document instance 104-2 of the collaborative document 102, examples of which are described in more detail with reference to FIG. 3. Each change record may comprise information for a modification made to a construct of the document instance 104-2. The document share component 122-2 may then modify properties of one or more constructs for the document instance 104-1 based on the change records to form a merged document instance 130 of the collaborative document 102. Conversely, changes made to the document instance 104-1 are captured and sent as a document update list 110 to a document share component 122-2 of an application program 120 managing the document instance 104-2 (which may be on a separate device). The document shared component 122-2 may update the document instance 104-2 based on a set of change records in the document update list 110, and form a merged document instance 130 of the collaborative document 102 from the document instance 104-2.

It is worthy to note that a merged document instance 130 merely represents a newer state of one of the document instances 104-1, 104-2 after a merge operation, and not necessarily a new document instance 104-b (e.g., 104-3). Authors may continue to modify the document instances 104-1, 104-2 after merge operations, with the document instances 104-1, 104-2 incorporating the merged updates represented by the merged document instance 130.

Undo/Redo Preservation

The application program 120 may comprise an undo manager component 122-3. The undo manager component 122-3 may be generally arranged to manage undo (and/or redo) operations for the application program 120. Although some embodiments are described with reference to undo operations, it may be appreciated that the embodiments are applicable to redo operations using similar principles. The embodiments are not limited in this context.

Undo is a command in many computer programs that reverses a last command or action performed for a document, such as an edit or format change made to the collaborative document 102. For example, if a user types a word into a word processing document, the undo command would erase a letter of the word or the entire word depending on a granularity selected for the undo command. The undo command provides a user a simple and automatic way to revert to an older state with a single command without manually removing previous changes which may take multiple commands.

A redo command is precisely the opposite of an undo command. Redo is a command in many computer programs that repeats a last command or action perform for a document, such as a collaborative document 102. For example, if a user types a word into a word processing document, the redo command would repeat a letter of the word or the entire word depending on a granularity selected for the redo command. The redo command provides a user a simple and automatic way to advance to a newer state with a single command without manually adding changes which may take multiple commands.

Various techniques are used to manage undo and redo operations depending on design goals for an application or system. Undo/redo models may include a linear undo/redo models and non-linear undo/redo models. In a linear model, for example, a linear undo is performed sequentially, while a non-linear undo is selected from an action list. Undo/redo models may also include single-user models and multi-user models. In a single-user model, for example, only a single user authors a document at any given time, and therefore only a single undo/redo stack is managed. In a multi-user model, however, multiple users may make changes to a single document. This is common in document collaboration systems, such as the document collaboration system 100, where multiple users are viewing and modifying a single collaborative document 102 at the same time. In multi-user scenarios, multiple undo/redo stacks are often needed, one for each user or device. Further, global and local undo/redo commands may be implemented in such an environment. As expected, multi-user models increase complexity of undo/redo commands, and therefore associated costs, relative to single-user models. As such, improvements to multi-user models may decrease complexity and associated costs.

To solve these and other problems, the undo manager component 122-3 may manage a local undo stack for the first document instance 104-1 in a manner that preserves the local undo stack during and after the document share component 122-2 performs merge operations between the document instances 104-1, 104-2 of the collaborative document 102 to form the merged document instance 130. By way of contrast, in conventional document collaboration systems, merge operations will typically disable or delete the local undo stack once the merged document instance 130 is formed as the local undo stack will not have knowledge of any updates made to the document instance 104-1 by edits from the document instance 104-2, thereby potentially producing unpredictable results when an action made to the document instance 104-1 is erased.

The undo manager component 122-3 may utilize information used by the document share component 122-2 to produce the merged document instance 130 to preserve the integrity of the local undo stack. In one embodiment, for example, the undo manager component 122-3 may manage the local undo stack for the document instance 104-1. The local undo stack may comprise a set of undo records, each storing a set of information to undo a modification made to a construct of the document instance 104-1, examples of which are described with reference to FIG. 5. The undo manager component 122-3 may determine whether to preserve one or more of the undo records of the local undo stack after formation of the merged document instance 130 based on an analysis of one or more of the change records.

FIG. 2 illustrates an embodiment of an operational environment 200 for the document collaboration system 100. The operational environment 200 illustrates operations of the document render component 122-1 rendering an example of a document instance 104-1 for a collaborative document 102. In this case, assume the collaborative document 102 is a digital montage, although the embodiments are not limited to this example.

As shown in FIG. 2, the document instance 104-1 may comprise a presentation surface 202 having multiple constructs 204-c. A construct 204-c is a discrete section, region or data unit of the presentation surface 202 that has a set of properties that can be modified in response to editing or formatting operations. In one embodiment, each construct 204-c may comprise one or more GUI elements having properties that can be modified, edited or formatted by a user. Examples of a construct 204-c may include without limitation data, content, content controls, words, numbers, tables, labels, graphs, documents, multimedia clips, captions, images, graphics, pictures, thumbnails, metadata, a presentation tile of a montage document, a paragraph of a word processing document, a cell of a spreadsheet document, a note for a note application document, a contact record for a contact manager document, and any other discrete section of a document of any desired granularity.

A user may utilize a user interface component 122-4 to edit multimedia content for various constructs 204-c. The user interface component 122-4 may generate various GUI views and provide a set of GUI tools to interact with the GUI views. A user may utilize the GUI tools to add, delete, or modify multimedia content presented by a construct 204-c. When the application program 120 is implemented as a montage application, for example, a user may use a GUI tool provided by the user interface component 122-4 to add a presentation tile for a montage, delete a video clip from a presentation tile for a montage, modify words to a caption for an image in a presentation tile, and so forth. The embodiments are not limited in this context.

A user may also utilize the user interface component 122-4 to modify a format or style for various multimedia content of the constructs 204-c. The user interface component 122-4 may offer GUI tools providing various formatting or style commands to modify various properties of multimedia content presented by the constructs 204-c. Examples of a properties that may be modified for multimedia content of a construct 204-c may include without limitation a font, a font style, a font size, a font color, an underline style, an underline color, an effect, a text effect, a text fill, a text outline, an outline style, a text shadow, a text reflection, a text glow, a text edge, a text three dimensional format, a position, animation, and so forth. The embodiments are not limited in this context.

Figure 2A:
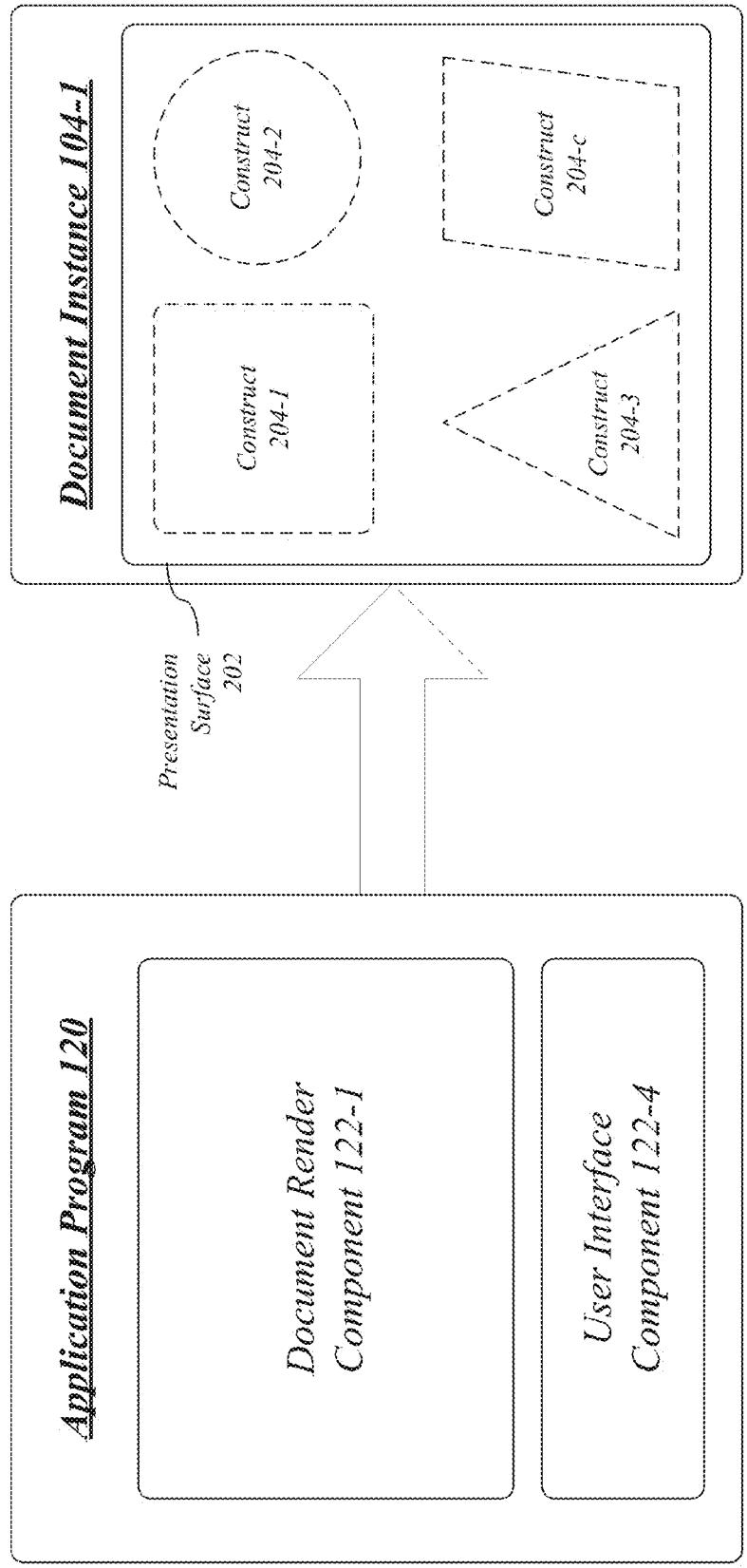
FIG. 2A illustrates an embodiment of a first operational environment for a document collaboration system.
Figure 2B:
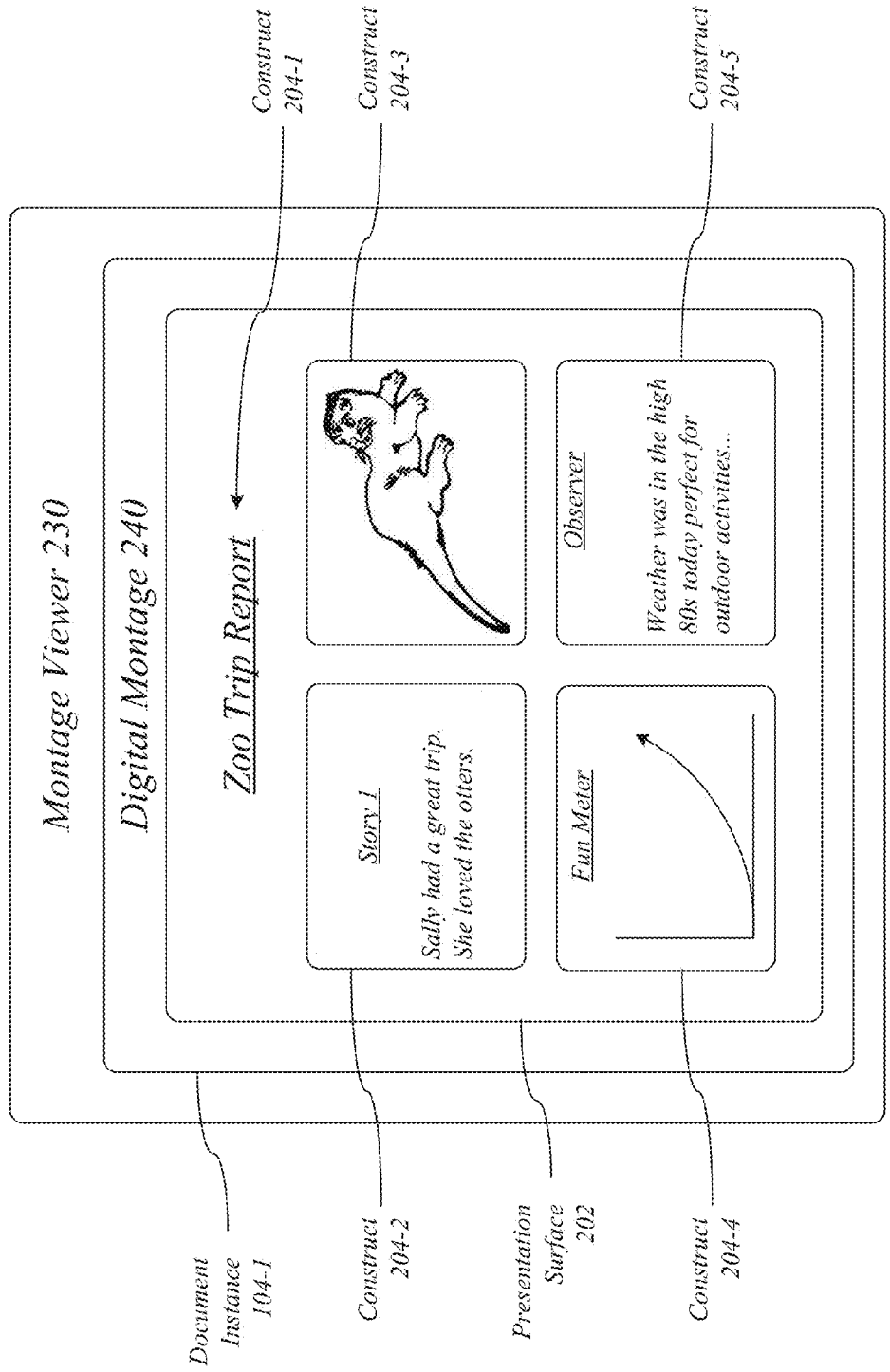
FIG. 2B illustrates an embodiment of a first operational environment with an exemplary collaborative document suitable for a document collaboration system.

FIG. 2B illustrates a specific example of a document instance 104-1 of a collaborative document 102 similar to the one described with reference to FIGS. 1 and 2A and suitable for the document collaboration system 100. The document render component 122-1 in conjunction with the user interface component 122-4 of the application program 120 may generate a user interface view 220. The user interface view 220 may be presented, for example, on a montage viewer 230. The montage viewer 230 may present a document instance 104-1 as part of the user interface view 220.

As shown in FIG. 2B, the document instance 104-1 is specifically implemented as a digital montage 240. In this case, the digital montage 240 may comprise five constructs 204-1, 204-2, 204-3, 204-4 and 204-5. The first construct 204-1 is a caption for the digital montage 240 that comprises multimedia content in the form of words that read "Zoo Trip Report." The second construct 204-2 comprises multimedia content in the form of a thumbnail for a word processing document that contains a story and a title for the story in the form of words that read "Story 1." The third construct 204-3 comprises multimedia content in the form of a thumbnail of an image of an otter. The fourth construct 204-4 comprises multimedia content in the form of a thumbnail for a spreadsheet document that contains a graph and a title for the graph in the form of words that read "Fun Meter." The fifth construct 204-5 comprises multimedia content in the form of a thumbnail of a newspaper article that contains a publisher of the newspaper article in the form of words that read "Observer."

Each of the constructs 204-1 to 204-5 of the digital montage 240 have various properties that may be modified. For example, the user interface component 122-4 may provide a set of GUI tools that allows a user to change multimedia content for one of the constructs 204-1 to 204-5. For instance, a user may utilize the GUI tools to edit content of the first construct 204-1 by changing the actual words of "Story 1" to "Sally's Story," or modify a format or style for the actual words "Story 1" to a bolded and underlined version of "Story 1."

Figure 3:
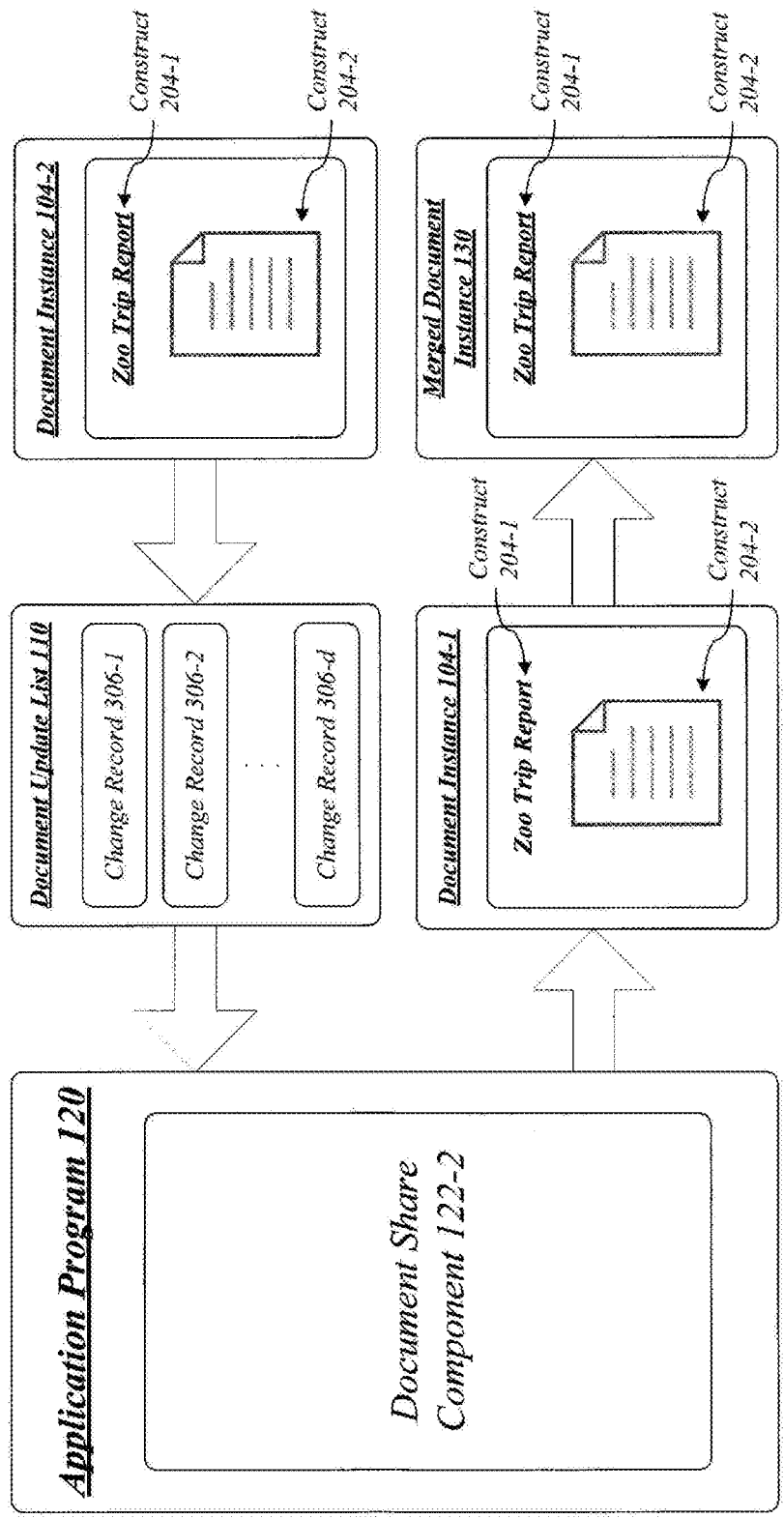
FIG. 3 illustrates an embodiment of a second operational environment for a document collaboration system.

FIG. 3 illustrates an embodiment of an operational environment 300 for the document collaboration system 100. The operational environment 300 illustrates operations of the document share component 122-2 to merge the document instances 104-1, 104-2 to form a merged document instance 130 for the collaborative document 102.

As previously described with reference to FIG. 1, the document share component 122-2 may periodically receive (or retrieve) a document update list 110. As shown in FIG. 3, the document update list 110 may comprise a set of change records 306-d for the document instance 104-2 of the collaborative document 102. Each change record 306-d may comprise a set of information for a modification made to a construct 204-c of the document instance 104-2. For instance, assume the document instance 104-2 includes two constructs 204-1, 204-2. The first construct 204-1 may comprise a caption comprising multimedia content in the form of the words "Zoo Trip Report." The second construct 204-2 may comprise a thumbnail of a word processing document representing the actual Zoo Trip Report. Further assume that the user executes a formatting command to format the multimedia content "Zoo Trip Report" by changing an underline property of the letters/words in "Zoo Trip Report" to form "Zoo Trip Report." A change record 306-1 capturing information for the underline formatting command is sent as part of the document update list 110 to the document share component 122-2. In one embodiment, the document update list 110 may be conveyed via a server, such as a MICROSOFT SHAREPOINT server hosting the collaborative document 102.

The document share component 122-2 of the application program 120 may receive the document update list 110, and process each of the change records 306-d to modify any properties of the constructs 204-1, 204-2 for the document instance 104-1 identified by the change records 306-d. In the course of processing the change records 306-d, the document share component 122-2 may retrieve information for the underline formatting command made to a construct 204-1 of the document instance 104-2 from the change record 306-1. The document share component 122-2 may use the retrieved information to modify the underline property of the construct 204-1 of the document instance 104-1 from no underlined "Zoo Trip Report" to underlined "Zoo Trip Report." Once all the change records 306-d are processed, the document share component 122-2 transforms the document instance 104-1 into a merged document instance 130 of the collaborative document 102.

Figure 4:
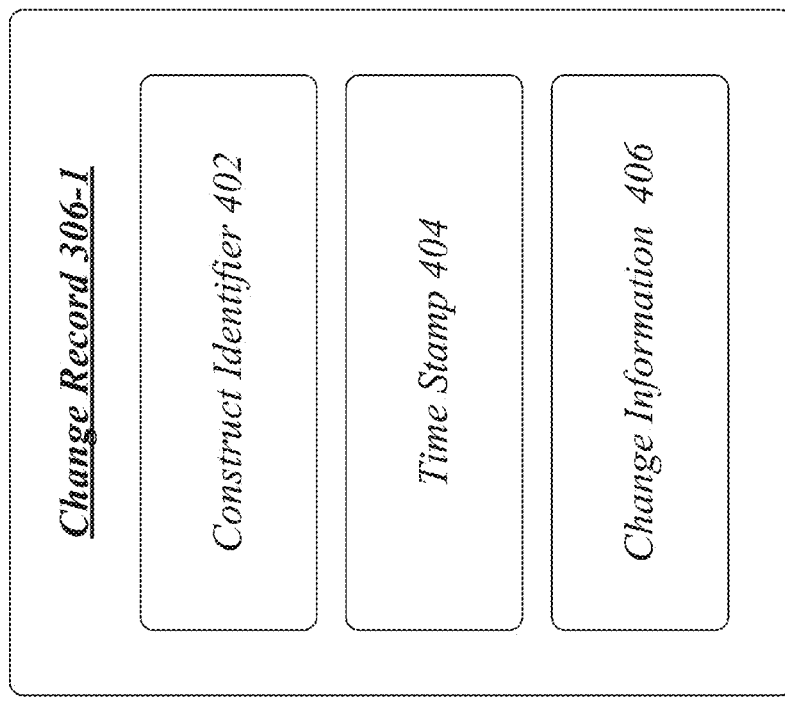
FIG. 4 illustrates an embodiment of a third operational environment for a document collaboration system.

FIG. 4 illustrates an embodiment of an operational environment 400 for the document collaboration system 100. The operational environment 400 illustrates a more detailed view of a change record 306-1. As shown in FIG. 4, the change record 306-1 may contain various types of information representing the underlined formatting command of the construct 204-1 executed in the document instance 104-2. A first type of information is a construct identifier 402. The construct identifier 402 may comprise a globally unique identifier (GUID) for a construct 204-c, which in this example is the construct 204-1. A second type of information is a time stamp 404. The time stamp 404 may indicate a date and/or a time when a modification was actually made to the construct 204-1 of the document instance 104-2 of the collaborative document 102 by an author. A third type of information is change information 406. The change information 406 may identify the actual changes, commands or actions made to multimedia content and/or properties of the multimedia content for the construct 204-1, which in this case is a formatting command to modify an underline property for the construct 204-1.

Figure 5:
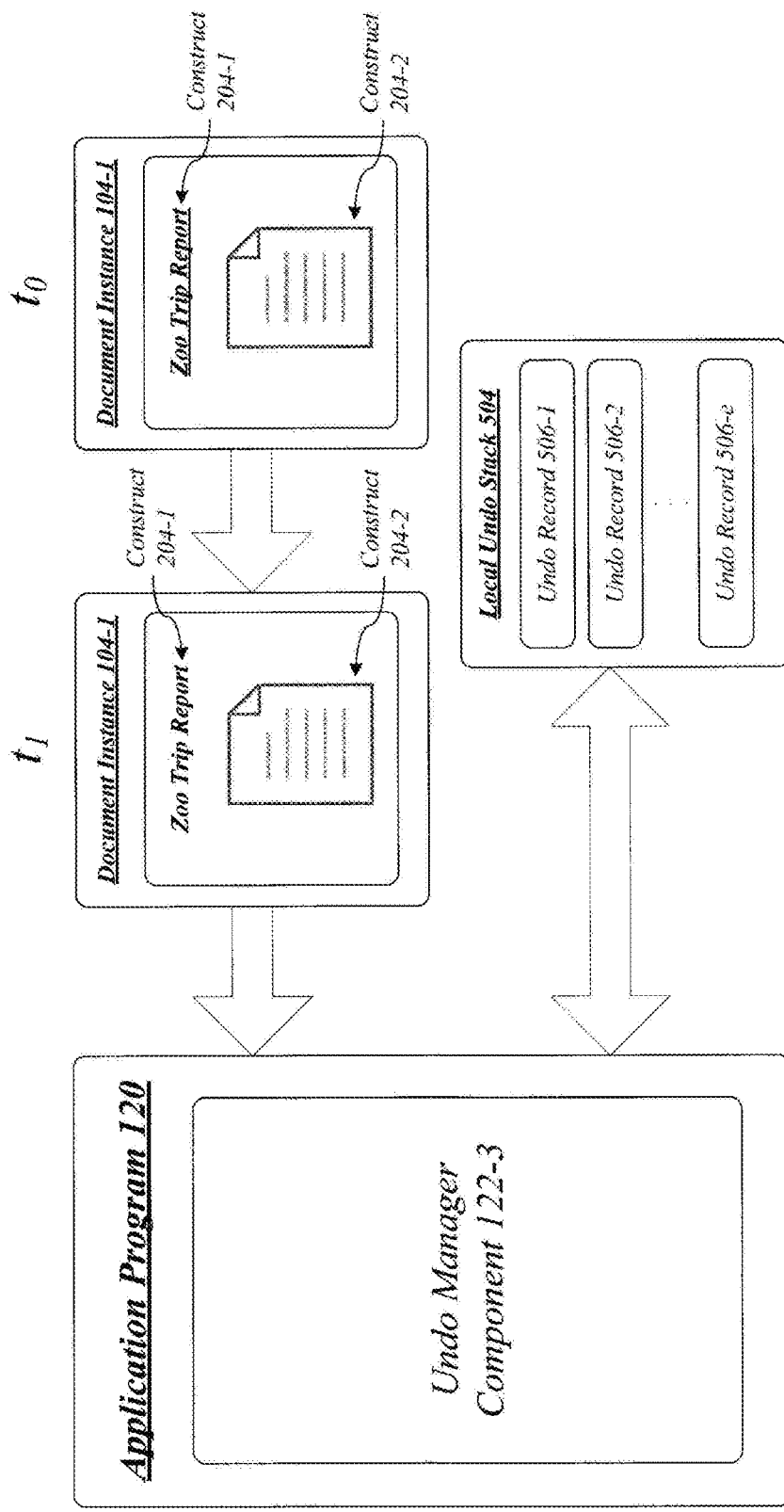
FIG. 5 illustrates an embodiment of a fourth operational environment for a document collaboration system.

FIG. 5 illustrates an embodiment of an operational environment 500 for the document collaboration system 100. The operational environment 500 may illustrate operations of the undo manager component 122-3 of the application program 120.

As previously described with reference to FIG. 1, the undo manager component 122-3 may manage a local undo stack 504 for the first document instance 104-1 in a manner that preserves the local undo stack 504 during and after the document share component 122-2 performs merge operations between the document instances 104-1, 104-2 of the collaborative document 102 to form the merged document instance 130.

As shown in FIG. 5, the undo manager component 122-3 may manage a local undo stack 504. The local undo stack may comprise a set of undo records 506-e. Each undo record 506-e may store a set of information to undo a modification made to a construct 204-c of the document instance 104-1. For instance, assume the document instance 104-1 includes two constructs 204-1, 204-2. The first construct 204-1 may comprise a caption comprising multimedia content in the form of the words "Zoo Trip Report." The second construct 204-2 may comprise a thumbnail of a word processing document representing the actual Zoo Trip Report. Further assume that the user executes a formatting command to format the multimedia content "Zoo Trip Report" by changing an underline property of the letters/words in "Zoo Trip Report" as shown at a time $t_0$ to remove the underline and form "Zoo Trip Report" as shown at time $t_1$. An undo record 506-1 capturing information for the underline removal command is stored as part of the local undo stack 504 managed by the undo manager component 122-3. Now assume that the user changes her mind, and wants "Zoo Trip Report" to revert to its older state at to where "Zoo Trip Report" is underlined as "Zoo Trip Report." The user may select a GUI tool for an undo command, which generates a control directive to the undo manager component 122-3 to remove the undo record 506-1, retrieve information needed to revert "Zoo Trip Report" back to the underlined version of "Zoo Trip Report."

Figure 6:
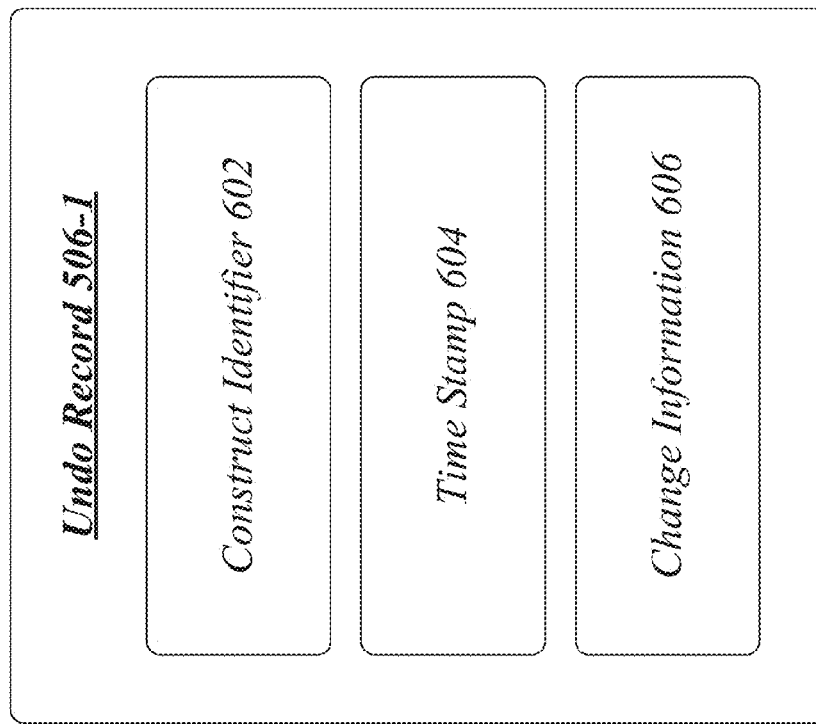
FIG. 6 illustrates an embodiment of a fifth operational environment for a document collaboration system.

FIG. 6 illustrates an embodiment of an operational environment 600 for the document collaboration system 100. The operational environment 600 illustrates a more detailed view of an undo record 506-1. As shown in FIG. 6, the undo record 506-1 may contain various types of information representing the underlined formatting command of the construct 204-1 executed in the document instance 104-1. A first type of information is a construct identifier 602. The construct identifier 602 may comprise a GUID for a construct 204-c, which in this example is the construct 204-1. A second type of information is a time stamp 604. The time stamp 604 may indicate a date and/or a time when a modification was actually made to the construct 204-1 of the document instance 104-1 of the collaborative document 102 by an author, which in this case is $t_0$ (e.g., 12/1/11, 6:08 pm EST). A third type of information is change information 606. The change information 606 may identify the actual changes, commands or actions made to multimedia content and/or properties of the multimedia content for the construct 204-1, which in this case is a formatting command to modify an underline property for the construct 204-1.

The change information 606 may vary depending on a given undo implementation. The undo manager component 122-3 may implement various types of undo techniques, such as a command pattern, a memento pattern, and so forth. The embodiments are not limited to these examples.

A command pattern is a software design pattern which can be used to implement multi-level undo operations. In object-oriented programming, the command pattern is a design pattern in which an object is used to represent and encapsulate all the information needed to call a method at a later time. This information includes the method name, the object that owns the method and values for the method parameters. Three terms typically associated with the command pattern are client, invoker and receiver. The client instantiates the command object and provides the information needed to call the method at a later time. The invoker decides when the method could be called. The receiver is an instance of the class that contains the method code.

A memento pattern is useful for capturing a state of an application program before user actions. This can be used for state reversal needed in some undo implementations. The memento pattern is implemented with two objects: an originator and a caretaker. The originator is some object that has an internal state. The caretaker is going to do something to the originator, but wants to be able to undo the change. The caretaker first asks the originator for a memento object. Then it does whatever operation (or sequence of operations) it was going to do. To roll back to the state before the operations, it returns the memento object to the originator. The memento object itself is an opaque object (one which the caretaker cannot, or should not, change). When using this pattern, care needs to be taken if the originator may change other objects or resources, as the memento pattern operates on a single object.

Figure 7:
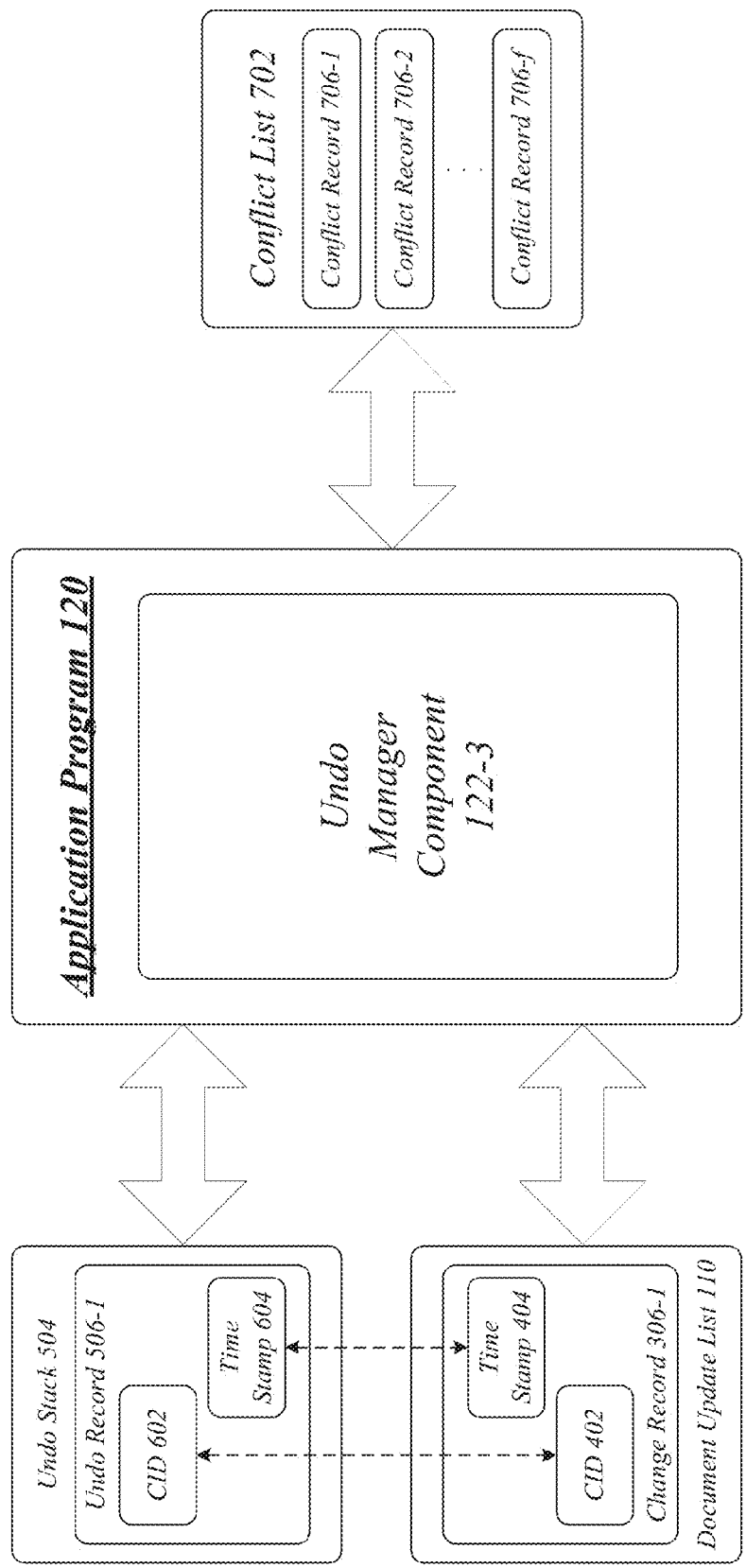
FIG. 7 illustrates an embodiment of a sixth operational environment for a document collaboration system.

FIG. 7 illustrates an embodiment of an operational environment 700 for the document collaboration system 100. The operational environment 700 illustrates operations of the undo manager component 122-3 when determining whether to preserve one or more of the undo records 506-e of the local undo stack 504 after formation of the merged document instance 130 based on an analysis of one or more of the change records 506-e.

The undo manager component 122-3 may utilize information used by the document share component 122-2 to produce the merged document instance 130 to preserve the integrity of the local undo stack 504. In one embodiment, for example, the undo manager component 122-3 may manage the local undo stack 504 for the document instance 104-1. The undo manager component 122-3 may determine whether to preserve one or more of the undo records 506-e of the local undo stack 504 after formation of the merged document instance 130 based on an analysis of one or more of the change records 306-d.

As shown in FIG. 7, the undo manager component 122-3 may determine whether a construct 204-1, 204-2 of an undo record 506-1 matches a construct 204-1, 204-2 of a change record 306-1. The undo manager component 122-3 may retrieve a construct identifier 402 from the change record 306-1 and a construct identifier 602 from the undo record 506-1. The undo manager component 122-3 may compare the construct identifiers 402, 602 to determine a match. When there is no match, then the undo manager component 122-3 retrieves a next change record 306-2, and repeats matching operations. The matching operations continue until all the change records 306-d for a given document update list 110 have been checked. Assuming there are no matching construct identifiers 402, 602 in any of the change records 306-d, then the undo record 506-1 may be preserved as part of the local undo stack 504. The undo manager component 122-3 then continues the above matching operations with the next undo record 506-2, and so forth, until some defined number (or all) of the undo records 506-e have been checked.

In cases where the construct identifiers 402, 602 do match, the undo manager component 122-3 may next determine whether a time stamp 604 of the undo record 506-1 and a time stamp 404 of the change record 306-1 are both within a synchronization interval when the undo record 506-1 and the change record 306-1 have matching construct identifiers 402, 602, examples of which are described with reference to FIG. 8. In the previous example, the construct identifiers 402, 602 are both for the construct 204-1, thereby confirming a match between the construct identifiers 402, 602. If the time stamps 404, 604 are within the same synchronization interval, then the undo record 506-1 is annotated as a conflict record 706-1 in a set of conflict records 706-f stored in a conflict list 702. The annotation operations continue for all undo records 506-e with matching construct identifiers 402, 602 and time stamps 404, 604 within a same synchronization interval.

Once the undo manager component 122-3 compiles one or more conflict records 706-f for the conflict list 702, the undo manager component 122-3 may begin to selectively remove any undo records 506-e from the local undo stack 504 when the undo record 506-e is annotated as a conflict record 706-f. Alternatively, the undo manager component 122-3 may delete the entire local undo stack 504 when an undo record 506-e, or a defined number of undo records 506-e, are annotated as conflict records 706-f.

For those undo records 506-e that either do not have matching construct identifiers 402, 602 or do not have time stamps 404, 604 within a same synchronization interval, the undo manager component 122-3 preserves those undo records 506-e on the local undo stack 504 for use by the user of the application program 120. In this manner, the document collaboration system 100 may perform merger operations for different document instances 104-b of a collaborative document 102 without disrupting undo/redo features provided by the application program 120 of the document collaboration system 100.

Figure 8:
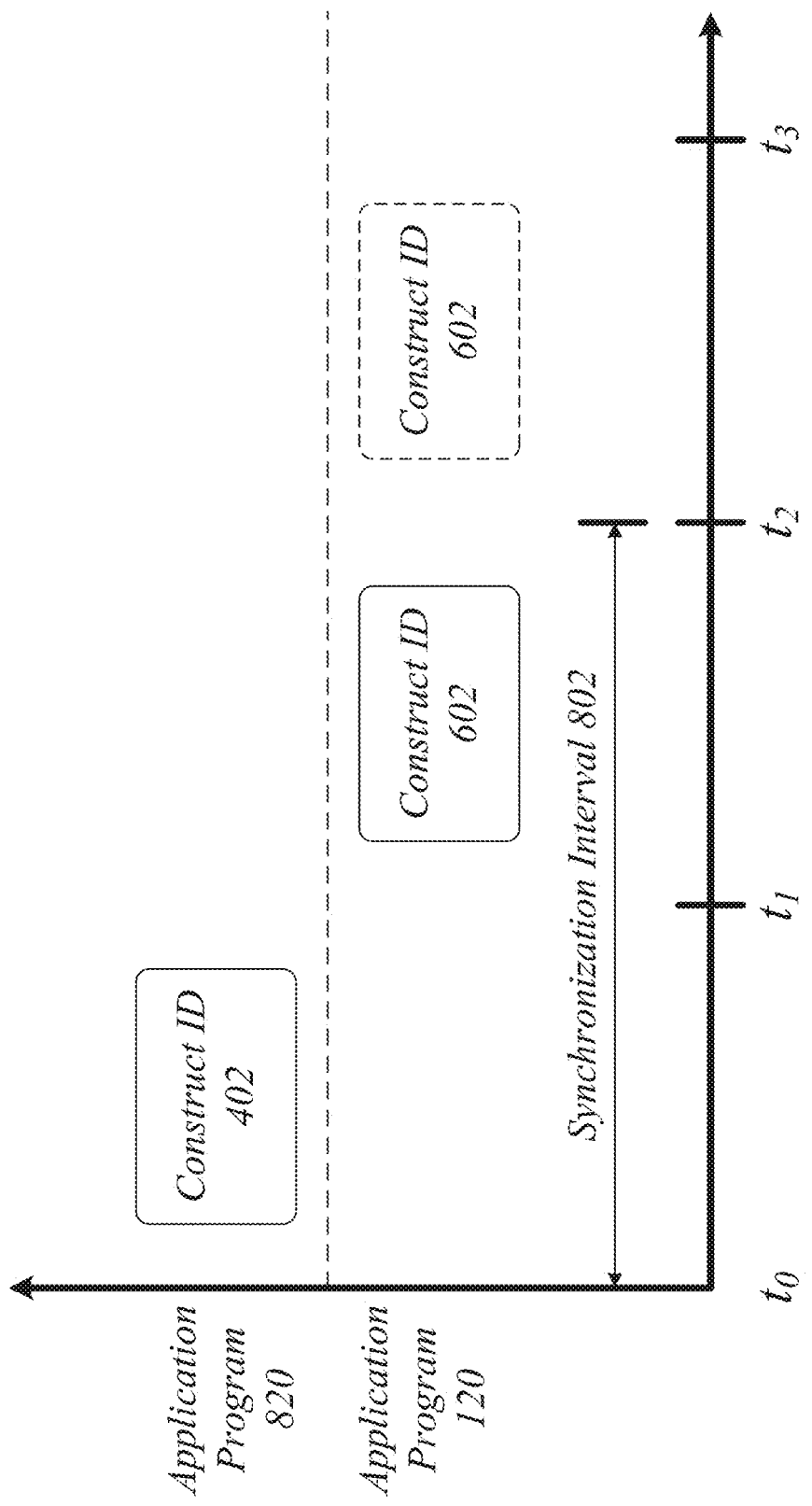
FIG. 8 illustrates an embodiment of a seventh operational environment for a document collaboration system.

FIG. 8 illustrates an embodiment of an operational environment 800 for the document collaboration system 100. The operational environment 800 illustrates operations of the undo manager component 122-3 when determining whether to preserve one or more of the undo records 506-e of the local undo stack 504 after formation of the merged document instance 130 based on an analysis of one or more of the change records 506-e.

As previously described with reference to FIG. 7, in those cases where the construct identifiers 402, 602 do match, the undo manager component 122-3 may next determine whether a time stamp 604 of the undo record 506-1 and a time stamp 404 of the change record 306-1 are both within a synchronization interval when the undo record 506-1 and the change record 306-1 have matching construct identifiers 402, 602.

The operational environment 800 illustrates a synchronization interval 802. The synchronization interval 802 represents a time interval or time period between when a first user makes a change to a construct 204-c (e.g., 204-1) and a second user is made aware of the change to the construct 204-c (e.g., 204-1). For instance, the synchronization interval 802 represents a time interval between receipt of document update lists 110.

As shown in FIG. 8, assume a first user utilizes an application program 820 to modify a construct 204-1 identified in a change record 306-1 as construct identifier 402 at time $t_0$. The application program 820 may be the same as, or compatible with, the application program 120. At some periodic interval, the application program 820 may send a document update list 110 with the change record 306-1. Further assume a second user utilizes the application program 120 to modify the construct 204-1 identified in an undo record 506-1 as construct identifier 602 at time $t_1$. The undo manager component 122-3 may compare the construct identifiers 402, 602, and determine that the construct identifiers 402, 602 both represent the construct 204-1 and therefore match. The undo manager component 122-3 may next determine whether a time stamp 604 of the undo record 506-1 and a time stamp 404 of the change record 306-1 are both within the synchronization interval 802. As indicated in FIG. 8, the synchronization interval 802 is a time interval bounded by time $t_0$ and time $t_2$, which may be represented as a time interval $T_s = t_2 - t_0$. In this case, the construct identifiers 402, 602 do match, and the time stamps 404, 604 are both within the synchronization interval 802, and therefore the undo manager component 122-3 annotates the undo record 506-1 as a conflict record 706-1 in the conflict list 702.

Construct Based Conflict Rules

In addition to the preservation of undo/redo features of the application programs 120, 820, the document share component 122-2 of the document collaboration system 100 may utilize a merge algorithm that implements a novel set of construct-based conflict rules or logic to automatically resolve conflicts for merge operations of edits to a collaborative document 102, thereby reducing or eliminating manual intervention by an author to resolve conflicts. This may be accomplished by the document share component 122-2 performing similar operations as the undo manager component 122-3 with respect to comparing a set of change records 306-d for each of the document instances 104-1, 104-2.

For some application programs 120, a number and granularity for a set of constructs 204-c are sufficiently large as to significantly reduce chances for actual merge conflicts. In a montage application, for example, a typical digital montage 240 may have a significant number of constructs 204-c. Further, a montage application may be used to generate digital montages 240 from existing multimedia content created by other application programs in a manner that is highly creative and attractive for user consumption, similar to a paper montage, and therefore is weighted more towards formatting and style operations rather than content generation and modification. Therefore, a montage application may typically have a higher frequency of formatting and style operations relative to edit operations of actual multimedia content. In addition, unlike edits to multimedia content where a single change in a letter or word may significantly alter a meaning of the multimedia content, changes in formatting or style of multimedia content has little if any impact on the underlying meaning of the formatted multimedia content. For these and other reasons, a montage application may utilize a novel set of construct-based conflict rules that utilize a different set of operational assumptions than traditional document collaboration systems, such as those predominantly directed to creating and editing multimedia content, such as a word processing application, for example.

One major underlying assumption of the novel set of construct-based conflict rules is that conflict resolution may be performed without use of an elaborate set of permissions or lock systems. In conventional application programs, such as word processing programs, coauthoring operations are implemented using a complex system of locks that assigned and tracked for each section of a document. The locks need to be tracked across local systems and network systems, thereby geometrically increasing complexity for a locking system. The lock system prevents two users from simultaneously modifying a same section. However, given a construct-based document, such as a collaborative document 102, probabilities of simultaneous edits are dramatically reduced. As such, the use of a complex lock system or permission system may be reduced or entirely obviated from the application program 120, thereby releasing a substantial portion of system resources previously dedicated to the locking system. In those few corner cases where simultaneous edits do occur, the construct-based conflict rules may be used to resolve these infrequent conflicts.

The document share component 122-2 may implement a novel set of construct-based conflict rules or logic to automatically resolve conflicts for merge operations of edits to a collaborative document 102. In one embodiment, the document share component 122-2 may retrieve a document update list 110-1 comprising a set of change records 306-d for a first document instance 140-1 of the collaborative document 102. The document update list 110-1 may be compiled as a first user makes changes to the document instance 104-1, and periodically sent from the application program 120 to the application program 820. The document share component 122-2 may determine whether a construct 204-c of a change record 306-d for the first document instance 104-1 of the collaborative document 102 matches a construct 204-c of a change record 306-d for the second document instance 104-2 of the collaborative document 102. The change records 306-d for the second document instance 104-2 may be retrieved from a document update list 110-2 received by the application program 120 from the application program 820.

In cases of matching constructs 204-c, the document share component 122-2 may determine whether a time stamp 404 of a change record 306-e for the first document instance 104-1 of the collaborative document 102 and a time stamp 404 of a change record 306-e for the second document instance 104-2 of the collaborative document 102 are both within a synchronization interval 802. If so, the document share component 122-2 annotates the change records as conflict records.

Once the conflict records are generated, the document share component 122-2 may attempt to resolve the conflict records using a set of construct-based conflict rules without modifying permissions for matching constructs 204-c in the conflict records. The construct-based conflict rules are designed so that all properties merge seamlessly unless the exact same property is changed by two users during the same synchronization interval 802. In that case, the last document update list 110 received by the server hosting the collaborative document 102 wins.

In one embodiment, the construct-based conflict rules may be summarized in Table 1 as follows:

TABLE 1

| | | User 1 Does This | | |
|---|---|---|---|---|
| | Edit | Formatting | Removal | Augmentation |
| User 2 Does This  Edit | Last to server | Combine | Edit Wins | N/A |
| Formatting | Combine | Last to server | Formatting Wins | N/A |
| Removal | Edit Wins | Formatting Wins | Removed | N/A |
| Augmentation | N/A | N/A | N/A | N/A |

For purposes of Table 1, the following definitions may be used. Edit may refer to a class of operations that are doing anything other than formatting to existing content within a construct 204-c. An example of an edit may comprise adding words to an existing caption, adding clips to a presentation tile, adding presentation tiles to a digital montage 240, and so forth. Formatting may refer to a class of operations that involves modifying a format or style of existing content, such as a property for a position, size, color, animation, font, or other format or style option as previously described. Augmentation may refer to a class of operations that involves adding a new construct 204-c to a digital montage 240, such as adding a tile, adding a clip, and so forth. Augmentations are considered a superset of edit operations. Removal may refer to a class of operations that involves deleting an entire construct 204-c from a digital montage 240, such as removing a tile, removing a clip, and so forth. Removals are considered a subset of edit operations.

There are a number of exception cases for montage applications that might not be handled by the construct-based conflict rules listed in Table 1. To handle exception cases, additional construct-based conflict rules may be utilized as shown in Table 2 as follows:

TABLE 2

| Exception Case | Rule |
|---|---|
| Exception Case 1 | In cases where the edit is a removal, treat it as a removal (e.g., removing a clip from a presentation tile) |
| Exception Case 2 | In cases when the edit is an augmentation, treat it as an augmentation (e.g., adding a clip to a presentation tile). |
| Exception Case 3 | Moves are treated as formatting. |
| Exception Case 4 | If two users add mutually-exclusive content to a same presentation tile in a same synchronization interval 802, a presentation tile is created for each content type. The duplicate presentation tile should be same size as the original presentation tile to avoid data loss. |

The exception cases 1-4 can be summarized as follows. First, editing or formatting take precedence over removals. Further, "in progress" content cannot be deleted. In a first deletion example, if a first user is editing or formatting a presentation tile of a document instance 104-1, the presentation tile cannot be deleted until editing or formatting operations are finished. A second user may delete it from a document instance 104-2. However, changes reflected in the document update list 110 for the document instance 104-1 will put it back in during merge operations. In a second deletion example, if a first user is editing a label for a presentation tile of a document instance 104-1, the label cannot be deleted until labeling operations are finished. Second, if two users edit and/or format the same construct 204-c, the last one to the server wins. Third, if formatting operations overlap each other, the last to the server wins. For example, if a first user "Tommy" reorders clips "A B C" to "B A C" and a second user "Jane" reorders the clips to "A C B" whoever's changes make it to the server last win.

Also, the editing, formatting, removal, or augmentation of a given construct 204-c should not reverse or back-out the editing, formatting, removal, or augmentation of a different construct 204-c. For example, assume Tommy adds a clip to a presentation tile and Jane edits a label for the same presentation tile. Both edits will be added to the digital montage 240. In another example, assume Tommy reorders clips "A B C D E" to "B A C D E" and Jane reorders the clips to "A B C E D," once both their changes have made it to the server the clips shall be ordered "B A C E D."

It is worthy to note that in those cases where a first user is doing anything to a clip A and a second user is doing anything to a caption for the clip A, the operations are combined. In this case, there is no last to server rule. Similarly, in those cases where a first user is doing anything to a presentation tile and a second user is doing anything to a label for the presentation tile, the operations are combined. In this case, there is no last to server rule.

The exception case examples given above for Table 2 may change depending on a particular application program 120. Some more examples of exception case rules for a montage application may be shown in Table 3 as follows:

TABLE 3

| User A action | User B action | Result |
|---|---|---|
| Caption change on clip 1 | Caption change on clip 1 | Last to server wins |
| Teaser change on clip 1 | Teaser change on clip 1 | Last to server wins |
| Caption change on clip 1 | Teaser change on clip 1 | Both changes merge in |
| Teaser change on clip 1 | Caption change on clip 1 | Both changes merge in |
| Clip 1 is edited (caption/teaser change) | Clip 1 is deleted | Edit wins |
| Clip 1 is deleted | Clip 1 is edited (Caption/teaser change) | Edit wins |
| Adds clip to Tile A | Adds clip to Tile A | Both clips are added |
| Deletes clip 1 from Tile A | Deletes clip 2 from Tile A | Both clips are deleted |
| Deletes last clip from Tile A | Adds new clip to Tile A | Both changes merge in |
| Adds picture clip to empty tile A | Adds doc clip to empty tile A | A picture tile and a doc tile are created |
| Changes Text Tile A | Changes Text Tile A | Last to server wins |
| Changes Text Tile A | Clears Text Tile A | Last edit to server wins |
| Clears Text Tile A | Changes Text Tile A | Last edit to server wins |
| Edits the Title for Tile A | Edits the Title for Tile A | Last edit to server wins |
| Edits the title for Tile A | Clears the title for tile A | Last edit to server wins |

TABLE 3-continued

| User A action | User B action | Result |
| --- | --- | --- |
| Clears the title for Tile A | Edits the title for Tile A | Last edit to server wins |
| Changes the position of clip A to n | Changes the position of clip A to z | Last to server wins |
| Changes the position of clip A to z | Changes the position of clip A to n | Last to server wins |
| Changes the position of clip A to n | Changes the position of clip B to n | Last to server wins |
| Moves clip A to tile B | Moves clip A to tile C | Last to server wins |

It may be appreciated that other exception case rules may be used as desired for a given implementation. The embodiments are not limited in this context.

It is worthy to note that Table 3 provides exception rules for a "teaser." In a montage document, a teaser is a visual representation, agent or thumbnail of an underlying content file providing a full set of content. In other words, a teaser is a concise set of information from an associated content file rendered in a way that allows a content consumer to quickly and easily determine whether an associated content file is of interest, and merits closer inspection of the associated content file.

One advantage of the set of construct-based conflict rules is that merge operations between the document instances 104-1, 104-2 do not cause content or format changes to appear unexpectedly in a collaborative document 102. The document share component 122-2 allows dynamic updates to the document instances 104-1, 104-2. For instance, as one user changes a construct 204-c of the document instance 104-1, the changes are propagated and materialize in the same construct 204-c of the document instance 104-2, and vice-versa. The time interval between changes in the document instance 104-1 and updates to the document instance 104-2 is a design variable, and in some cases, is configurable by a user. The set of construct-based conflict rules are designed such that all properties merge seamlessly unless the exact same property is changed by two users during the same synchronization interval 802. This case rarely occurs due to nature of the constructs 204-c of the collaborative document 102, particularly for a montage application, as previously described. However, in those rare occurrences where this case does arise, the last change propagated to the server hosting the collaborative document 102 is used to form the merged document instance 130. This may occasionally result in a lost change by a user, while providing a substantial reduction in complexity of the merge algorithm and therefore a significant improvement in resource utilization.

Figure 9:
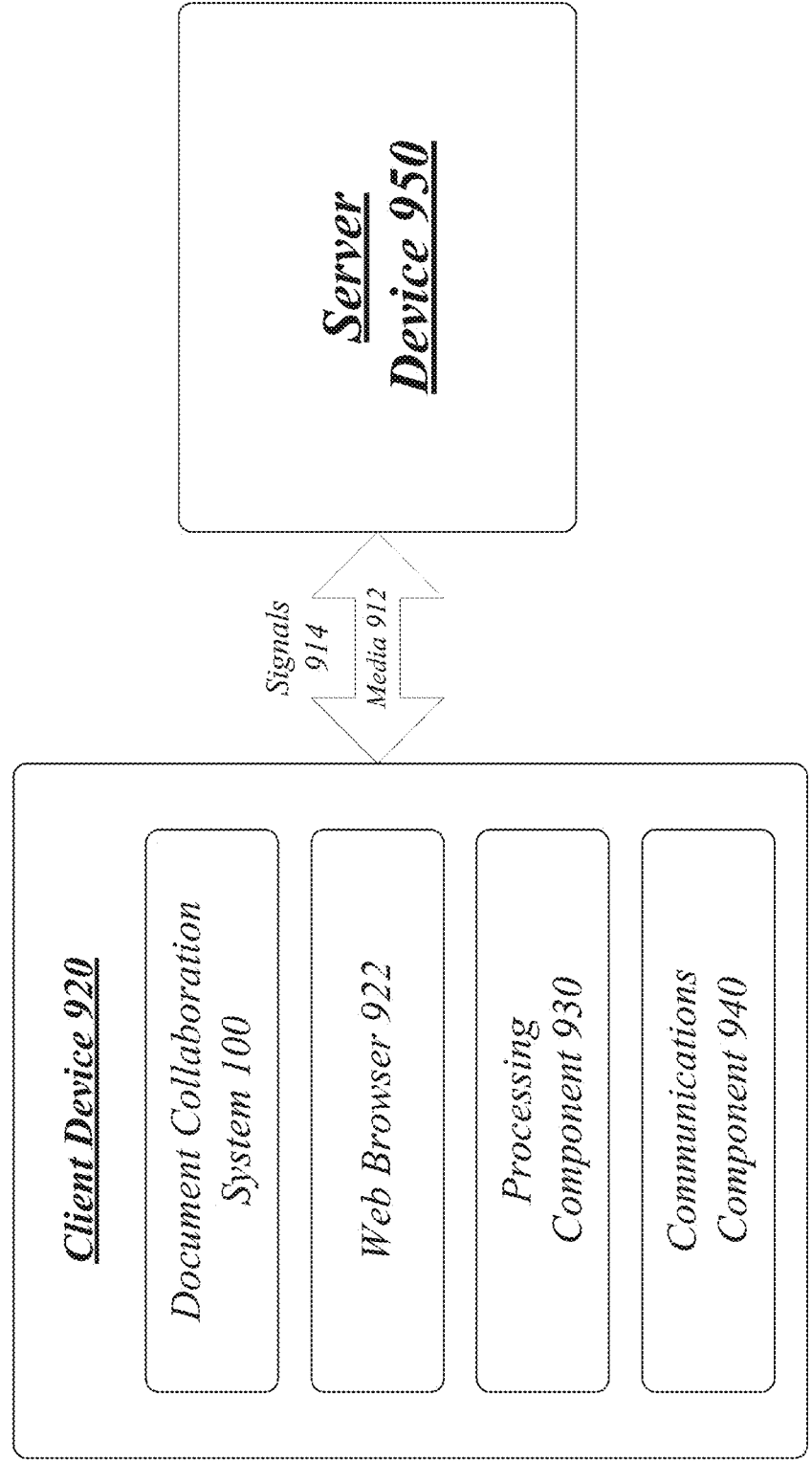
FIG. 9 illustrates an embodiment of a centralized system for the document collaboration system of FIG. 1.

FIG. 9 illustrates a block diagram of a centralized system 900. The centralized system 900 may implement some or all of the structure and/or operations for the document collaboration system 100 in a single computing entity, such as entirely within a client device 920.

The client device 920 may comprise any electronic device capable of receiving, processing, and sending information for the document collaboration system 100. Examples of an electronic device may include without limitation an ultra-mobile device, a mobile device, a personal digital assistant (PDA), a mobile computing device, a smart phone, a telephone, a digital telephone, a cellular telephone, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The client device 920 may execute processing operations or logic for the document collaboration system 100 using a processing component 930. The processing component 930 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The client device 920 may execute communications operations or logic for the document collaboration system 100 using communications component 940. The client device 920 may communicate with a server device 950 over a communications media 912 using communications signals 914 via the communications component 940. The communications component 940 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 940 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 912 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The client device 920 may comprise or employ one or more client programs that operate to perform various methodologies in accordance with the described embodiments. In one embodiment, for example, the client device 920 may implement the document collaboration system 100, which includes the application program 120. The client device 920 may receive a document update list 110 with changes made to the document instance 104-2 from the server device 950. The server application program 1022 may receive the document update list 110 from another client device implementing an application program 820 managing the document instance 104-2, as described in more detail with reference to FIG. 10. The client device 920 may also send a document update list 110 with changes made to the document instance 104-1 to the server device 950 for forwarding to the other client device. The application programs 120, 820 may exchange document update lists 110 using a push model on a periodic basis, an aperiodic basis, or a continuous basis. Further, the application programs 120, 820 may exchange document updates lists 110 using a pull model on a periodic basis, an aperiodic basis, or an on-demand basis. When the application programs 120, 820 are implemented as MICROSOFT OFFICE products, users of MICROSOFT OFFICE may access external data via connection-specifications saved in office data connection (ODC) files. The embodiments are not limited in this context.

The client device 920 may also implement a web browser 922. The web browser 922 may execute on the processing component 930. The web browser 922 may be a conventional hypertext viewing application such as MICROSOFT INTERNET EXPLORER®, APPLE® SAFARI®, FIREFOX® MOZILLA®, GOOGLE® CHROME®, OPERA®, and other commercially available web browsers. Secure web browsing may be supplied with 128 bit (or greater) encryption by way of hypertext transfer protocol secure (HTTPS), secure sockets layer (SSL), transport security layer (TSL), and other security techniques. Web browser 922 may allow for the execution of program components through facilities such as ActiveX, AJAX, (D)HTML, FLASH, Java, JavaScript, web browser plug-in APIs (e.g., FireFox, Safari Plug-in, and the like APIs), and the like. The web browser 922 may communicate to and with other components in a component collection, including itself, and facilities of the like. Most frequently, the web browser 922 communicates with information servers (e.g., server device 950), operating systems, integrated program components (e.g., plug-ins), and the like. For example, the web browser 922 may contain, communicate, generate, obtain, and provide program component, system, user, and data communications, requests, and responses. Of course, in place of the web browser 922 and information server, a combined application may be developed to perform similar functions of both.

A user may utilize the web browser 922 to access applications and services provided by the server device 950, as described in more detail with reference to FIG. 10. For instance, the web browser 922 may be used to store a collaborative document 102 in a network storage location accessible by both application programs 120, 820. The web browser 922 may also be used to access cloud-based applications and services, such as online document collaboration applications, services and tools.

Figure 10:
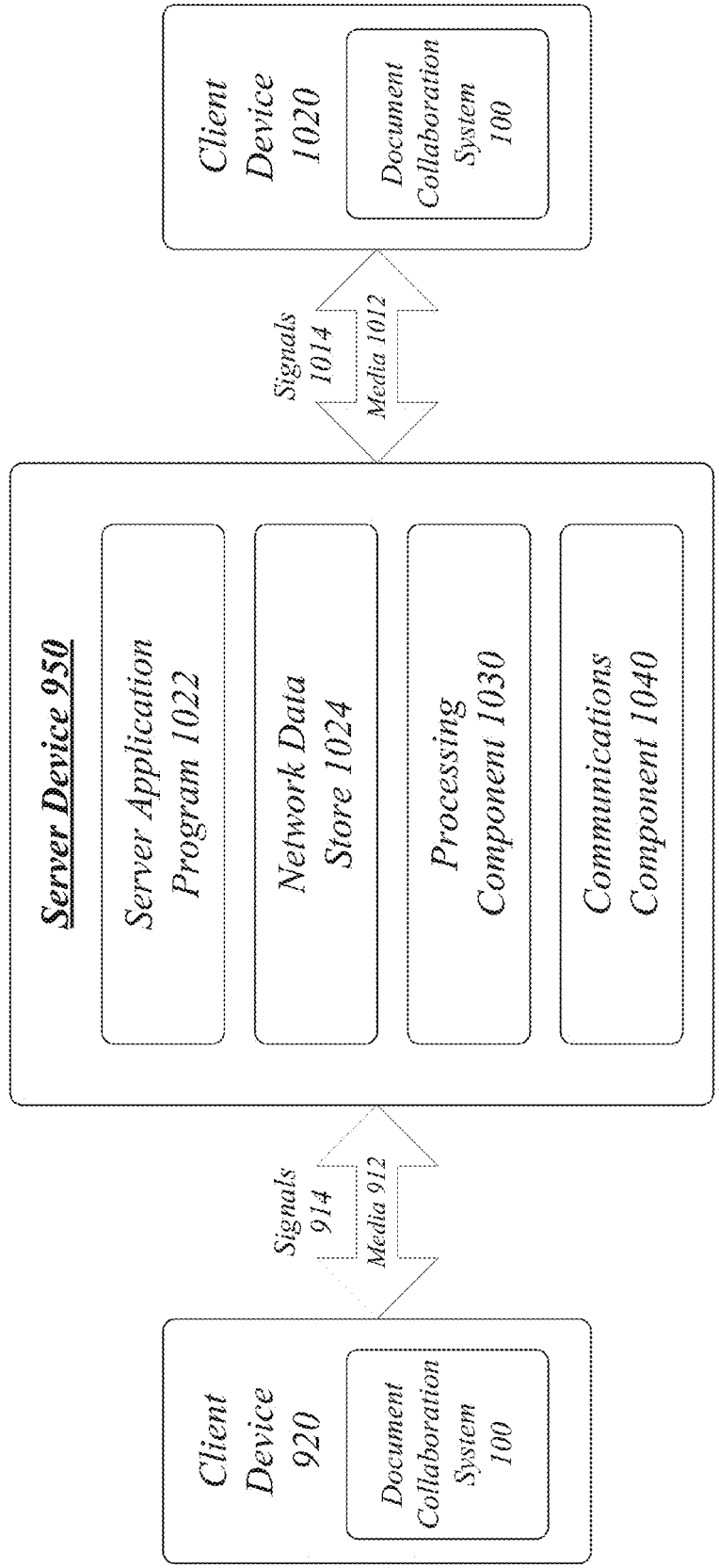
FIG. 10 illustrates an embodiment of a distributed system for the document collaboration system of FIG. 1.

FIG. 10 illustrates a block diagram of a distributed system 1000. The distributed system 1000 may distribute portions of the structure and/or operations for the document collaboration system 100 across multiple computing entities. Examples of distributed system 1000 may include without limitation a client-server architecture, a S-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1000 may comprise the client device 920 as described with reference to FIG. 9. The distributed system 1000 may further comprise a client device 1020 that is the same or similar to the client device 920. The client device 1020 may comprise or employ one or more client programs that operate to perform various methodologies in accordance with the described embodiments. In one embodiment, for example, the client device 1020 may implement a separate version of the document collaboration system 100 with the application program 820 (or 120) which is managing the document instance 104-2 and executing on a processing component 930 implemented by the client device 1020. The client device 1020 may communicate with the server device 950 over a communications media 1012 using communications signals 1014 via a communications components 940 implemented by the client device 1020.

The distributed system 1000 may also comprise the server device 950 as described with reference to FIG. 9. The server device 950 may be similar to the client device 920 as described in FIG. 9. For instance, the server device 950 may comprise a processing component 1030 and a communications component 1040 which are the same or similar to the processing component 930 and the communications component 940, respectively, as described with reference to FIG. 9. Further, the server device 1050 may comprise or employ one or more server programs that operate to perform various methodologies in accordance with the described embodiments.

In one embodiment, for example, the server device 950 may implement a server application program 1022 and a network data store 1024. Examples for a server application program 1022 may include without limitation MICROSOFT SHAREPOINT SERVER, MICROSOFT SKYDRIVE® SERVER, MICROSOFT LYNC SERVER, MICROSOFT OFFICE FORMS SERVER, MICROSOFT OFFICE GROOVE® SERVER, MICROSOFT OFFICE PROJECT SERVER, MICROSOFT OFFICE PROJECT PORTFOLIO SERVER, and MICROSOFT OFFICE PERFORMANCEPOINT® SERVER. Additionally or alternatively, the server application program 1022 and the network data store 1024 may be implemented as web services using various web technologies. Examples for web services may include without limitation MICROSOFT WINDOWS LIVE®, MICROSOFT OFFICE WEB APPLICATIONS, MICROSOFT OFFICE LIVE, MICROSOFT LIVE MEETING, MICROSOFT OFFICE PRODUCT WEB SITE, MICROSOFT UPDATE SERVER, and MICROSOFT OFFICE 365. The embodiments are not limited to these examples.

The server application program 1022 may be used to manage network operations between the document collaboration systems 100 executing on the client devices 920, 1020. For instance, the server application program 1022 may host or manage one or more collaborative documents 102 stored in the network data store 1024, and surface the collaborative documents 102 to the document collaboration systems 100 executing on the respective client devices 920, 1020. The server application program 1022 may also facilitate exchange of document update lists 110 between the document collaboration systems 100 executing on the respective client devices 920, 1020. For example, the collaborative document 102 may be stored in a shared folder on a MICROSOFT SKYDRIVE server, a same document library on a MICROSOFT SHAREPOINT server, or some other shared network resource.

The server application program 1022 may also coordinate startup operations when the document collaboration systems 100 executing on the respective client devices 920, 1020 are ready to begin coauthoring operations. For instance, when a first user opens a document instance 104-1 of a collaborative document 102 using the application program 120 on the client device 920, the application program 120 will take one or more shared locks and put them in an editors table. The application program 120 will initiate a ping to the server application program 1022 to determine whether any other users are simultaneously working on a document instance 104-2 of the collaborative document 102, such as a second user of the application program 820 executing on the client device 1020. If there is a second user, then the application programs 120, 820 and the server application program 1022 will begin executing coauthoring operations.

For certain implementations of the application programs 120, 820, such as word processing programs, an intricate set of intra-document locks are initiated and managed by the application programs 120, 820 and the server application program 1022. In this case, a different set of signaling is communicated over the media 912, 1012 to coordinate the intra-document locks during editing and merge operations. However, other implementations of the application programs 120, 820, such as a montage application, do not need such intra-document locks. In such cases, the application program 120 may manage coauthoring operations using a pull model by sending periodic update pings to the server application program 1022 to check for any updates from the application program 820. The frequency of the update pings may be determined based on client load or server load, among other factors. A typical frequency is one update ping every 15 seconds.

To control or manage updates during coauthoring operations, the application programs 120, 820 may implement a configurable timer. The configurable timer may be used to merge updates from the server into the application programs 120, 820. The configurable timer may also be used to save only the "dirty" or changed portions of the application programs 120, 820, and send them to the server application program 1022. The configurable timer may be manually configured by a user or automatically configured based on a policy. In the latter case, the configurable timer may be configured based on system resources. It is worthy to note that the save/refresh should be incremental and frequent since it likely needs to be synchronous but it should not be so frequent as to cause the application programs 120, 820 to lock or hang.

The configurable timer is subject to various exceptions which effectively pause it or force a merge/save. Examples for exceptions may be illustrated in the list below as follows:
1. Regardless of a state of the configurable timer, if there are any dirty bits or updates available, execute a save/refresh when users:
    a. Moving in or out of spaces and "subspaces" within spaces
        i. Enter depth view
        ii. Exit depth view
        iii. Navigate to next item in depth view
        iv. Enter a construct
        v. Exit a construct
    b. Add/Remove Content
        i. Insert new content
        ii. Remove content
        iii. Add tile
        iv. Remove tile
        v. Commit teaser change
        vi. On drop of content to add or rearrange
        vii. Add/remove comment
    c. Discrete formatting action
        i. Change tile style
        ii. Change theme and all sub-theme components
        iii. Change background
    d. Click out of text region
    e. OS suspend and terminate
    f. App losing focus
    g. Dismiss context menu
2. Regardless of the state of the timer, if there are any dirty bits or updates available, do not execute a save/refresh when users:
    a. Are in depth view except when the user navigates to a next item in depth view a save/refresh may be executed
    b. Are showing the insert dialog
    c. Click into/are editing in a text region
    d. Show context menu
    e. When dragging content In some cases, a montage application will timeout coauthors. Within the editors table each author will write out a timestamp which is refreshed more frequently than once per hour. If the montage application downloads an editor table and finds an author having a timestamp that is greater than some defined time threshold (e.g., 1 hour old), the montage application will remove that author from the editors table and re-upload it to the server application program 1022.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be needed for a novel implementation.

FIG. 11 illustrates one embodiment of a logic flow 1100. The logic flow 1100 may be representative of some or all of the operations executed by one or more embodiments described herein.

In the illustrated embodiment shown in FIG. 11, the logic flow 1100 may retrieve a set of undo records of a local undo stack, each undo record comprising information to undo a modification made to a construct of a first document instance of a collaborative document, at block 1102. For example, the undo manager component 122-3 may retrieve a set of undo records 506-e of a local undo stack 504. Each undo record 506-e may comprise information to undo a modification made to a construct 204-1 of a first document instance 104-1 of a collaborative document 102. The information may comprise, for example, a construct identifier 602, a time stamp 604, and change information 606.

The logic flow 1100 may retrieve a set of change records of a document update list, each change record comprising information for a modification made to a construct of a second document instance of the collaborative document, at block 1104. For example, the undo manager component 122-3 may retrieve a set of change records 306-*d* of a document update list 110, each change record 306-*d* comprising information for a modification made to a construct 204-1 of a second document instance 104-2 of the collaborative document 102. The information may comprise, for example, a construct identifier 402, a time stamp 404, and change information 406. The undo manager component 122-3 may receive the document update list 110 from the application program 820 of the document collaboration system 100 implemented by the client device 1020 via the server application program 1022 implemented by the server device 950.

The logic flow 1100 may compare the set of undo records and the set of change records at block 1106. For example, the undo manager component 122-3 may compare the set of undo records 506-*e* and the set of change records 306-*d*. More particularly, the undo manager component 122-3 may compare construct identifiers 402, 602, for a change record 306-*d* and an undo record 506-*e*, respectively. When matching, the undo manager component 122-3 may determine whether the time stamps 404, 604 of the matching records are within a synchronization interval 802, and if so, create a conflict record 706-*f* for a conflict list 702.

The logic flow 1100 may determine whether to preserve one or more of the undo records of the local undo stack based on the comparison results at block 1108. For example, the undo manager component 122-3 may determine whether to preserve one or more of the undo records 506-*e* of the local undo stack 504 based on the conflict records 706-*f* in the conflict list 702.

Figure 12:
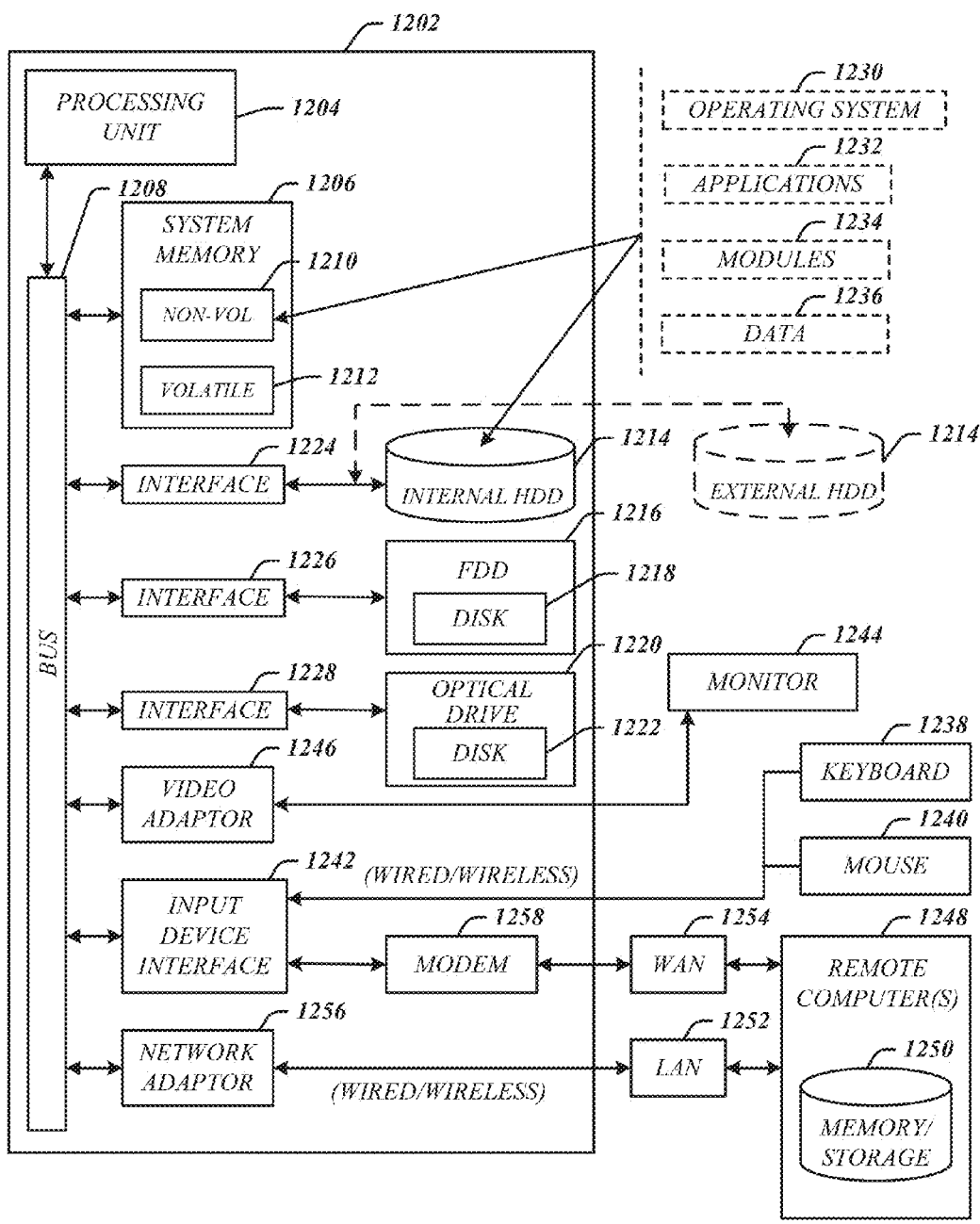
FIG. 12 illustrates an embodiment of a computing architecture.

FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described with reference to FIG. 9, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1212. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM or DVD). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1212, including an operating system 1230, one or more application programs 1232, other program modules 1234, and program data 1236. In one embodiment, the one or more application programs 1232, other program modules 1234, and program data 1236 can include, for example, the various applications and/or components of the document collaboration system 100.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A monitor 1244 or other type of display device is also connected to the system bus 1208 via an interface, such as a video adaptor 1246. The monitor 1244 may be internal or external to the computer 1202. In addition to the monitor 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
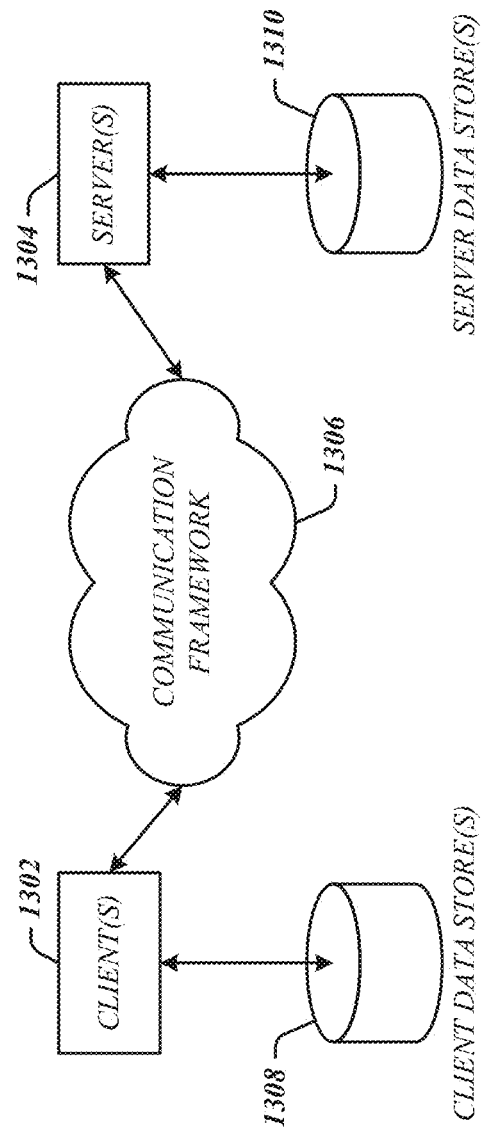
FIG. 13 illustrates an embodiment of a communications architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1302 and servers 1304. The clients 1302 may implement the client devices 920, 1020. The servers 1304 may implement the server device 950. The clients 1302 and the servers 1304 are operatively connected to one or more respective client data stores 1308 and server data stores 1310 that can be employed to store information local to the respective clients 1302 and servers 1304, such as cookies and/or associated contextual information.

The clients 1302 and the servers 1304 may communicate information between each other using a communication framework 1306. The communications framework 1306 may implement any well-known communications techniques and protocols. The communications framework 1306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth needed by clients 1302 and the servers 1304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method implemented in computer hardware, comprising:
processing a collaborative document having a presentation surface with multiple constructs;
rendering a first document instance of the collaborative document;
receiving a document update list comprising a set of change records for a second document instance of the collaborative document, each change record comprising information for a modification made to a construct of the second document instance;
determining that a time stamp of an undo record and a time stamp of a change record are both within a synchronization interval when the undo record and the change record have matching constructs, annotating the undo record as a conflict record, and resolving the conflict record using a set of construct-based conflict rules;
modifying properties of one or more constructs for the first document instance based on the change records to form a merged document instance of the collaborative document;
managing a local undo stack for the first document instance, the local undo stack comprising a set of undo records each storing information to undo a modification made to a construct of the first document instance; and
preserving one or more of the undo records of the local undo stack after formation of the merged document instance based on one or more of the change records.

2. The method of claim 1, comprising processing an undo record storing a time stamp indicating a date and a time when a modification was made to a construct of the first document instance of the document.

3. The method of claim 1, comprising processing a change record storing a time stamp indicating a date and a time when a modification was made to a construct of the second document instance of the document.

4. The method of claim 1, comprising determining whether a construct of an undo record matches a construct of a change record.

5. The method of claim 1, comprising removing an undo record from the local undo stack when the undo record is annotated as a conflict record.

6. The method of claim 1, comprising deleting the local undo stack when an undo record is annotated as a conflict record.

7. The method of claim 1, comprising receiving a document update list comprising a set of change records for the first document instance of the collaborative document.

8. The method of claim 1, comprising determining whether a construct of a change record for the first document instance of the collaborative document matches a construct of a change record for the second document instance of the collaborative document.

9. The method of claim 1, comprising determining whether a time stamp of a change record for the first document instance of the collaborative document and a time stamp of a change record for the second document instance of the collaborative document are both within a synchronization interval when the change records have matching constructs, and annotating the change records as conflict records.

10. The method of claim 1, comprising resolving conflict records without modifying permissions for matching constructs in the conflict records.

11. An apparatus, comprising:
a processor circuit coupled to memory; and
an application program stored in the memory and operative to:
 retrieve, by the processor circuit, a set of undo records of a local undo stack, each undo record comprising information to undo a modification made to a construct of a first document instance of a collaborative document,
 retrieve, by the processor circuit, a set of change records of a document update list, each change record comprising information for a modification made to a construct of a second document instance of the collaborative document,
 determine, by the processor circuit, whether a time stamp of an undo record and a time stamp of a change record are both within a synchronization interval when the undo record and the change record have matching constructs, and if so, annotate the undo record as a conflict record and delete the local undo stack,
 compare, by the processor circuit, the set of undo records and the set of change records to produce comparison results, and
 determine whether to preserve, by the processor circuit, one or more of the undo records of the local undo stack based on the comparison results.

12. The apparatus of claim 11, wherein the application program is further operative to determine whether a construct of an undo record matches a construct of a change record.

13. The apparatus of claim 11, wherein the application program is further operative to remove an undo record from the local undo stack when the undo record is annotated as a conflict record.

14. The apparatus of claim 11, wherein the application program is further operative to resolve the conflict record using a set of construct-based conflict rules without modifying permissions for matching constructs in the conflict records.

* * * * *